United States Patent
Desai et al.

(10) Patent No.: US 10,321,077 B2
(45) Date of Patent: Jun. 11, 2019

(54) LINE BUFFER UNIT FOR IMAGE PROCESSOR

(71) Applicant: Google LLC, Mountain View, CA (US)

(72) Inventors: Neeti Desai, Sunnyvale, CA (US); Albert Meixner, Mountain View, CA (US); Qiuling Zhu, San Jose, CA (US); Jason Rupert Redgrave, Mountain View, CA (US); Ofer Shacham, Palo Alto, CA (US); Daniel Frederic Finchelstein, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/598,027

(22) Filed: May 17, 2017

(65) Prior Publication Data

US 2017/0257585 A1    Sep. 7, 2017

Related U.S. Application Data

(63) Continuation of application No. 14/694,712, filed on Apr. 23, 2015, now Pat. No. 9,756,268.

(51) Int. Cl.
*H04N 5/369* (2011.01)
*G06T 1/60* (2006.01)
*H04N 5/91* (2006.01)

(52) U.S. Cl.
CPC ............ *H04N 5/3692* (2013.01); *G06T 1/60* (2013.01); *H04N 5/91* (2013.01)

(58) Field of Classification Search
None
See application file for complete search history.

(56) References Cited

U.S. PATENT DOCUMENTS

| 4,445,177 A | 4/1984 | Bratt et al. |
| 4,835,712 A | 5/1989 | Drebin et al. |
| 4,908,644 A | 3/1990 | Shindo et al. |
| 4,935,894 A | 6/1990 | Ternes et al. |
| 5,253,308 A * | 10/1993 | Johnson .................. G06T 1/20 382/304 |

(Continued)

FOREIGN PATENT DOCUMENTS

| EP | 0293701 | 12/1988 |
| JP | H10-340340 | 12/1998 |

(Continued)

OTHER PUBLICATIONS

International Search Report and Written Opinion issued in International Application No. PCT/US2016/025385, dated Jul. 5, 2016, 13 pages.

(Continued)

*Primary Examiner* — James M Hannett
(74) *Attorney, Agent, or Firm* — Fish & Richardson P.C.

(57) ABSTRACT

An apparatus is described that include a line buffer unit composed of a plurality of a line buffer interface units. Each line buffer interface unit is to handle one or more requests by a respective producer to store a respective line group in a memory and handle one or more requests by a respective consumer to fetch and provide the respective line group from memory. The line buffer unit has programmable storage space whose information establishes line group size so that different line group sizes for different image sizes are storable in memory.

16 Claims, 23 Drawing Sheets

(56) References Cited

U.S. PATENT DOCUMENTS

| | | | |
|---|---|---|---|
| 5,612,693 A | 3/1997 | Craft et al. | |
| 5,751,864 A | 5/1998 | Moriwake et al. | |
| 5,892,962 A | 4/1999 | Cloutier | |
| 6,031,573 A | 2/2000 | MacCormack | |
| 6,049,859 A | 4/2000 | Gliese et al. | |
| 6,366,289 B1* | 4/2002 | Johns | G06F 12/023 |
| | | | 345/543 |
| 6,587,158 B1 | 7/2003 | Adams et al. | |
| 6,728,862 B1 | 4/2004 | Wilson | |
| 6,745,319 B1 | 6/2004 | Balmer et al. | |
| 6,757,019 B1* | 6/2004 | Hsieh | H04N 5/335 |
| | | | 348/294 |
| 6,970,196 B1* | 11/2005 | Ishikawa | G06T 1/0007 |
| | | | 348/222.1 |
| 7,010,177 B1 | 3/2006 | Mattison | |
| 7,167,890 B2 | 1/2007 | Lin et al. | |
| 7,200,287 B2 | 4/2007 | Fukuda et al. | |
| 7,286,717 B2 | 10/2007 | Nomizu | |
| 7,454,593 B2* | 11/2008 | Kirsch | G06F 15/17337 |
| | | | 712/11 |
| 7,581,851 B2 | 9/2009 | Kudo et al. | |
| 7,941,614 B2 | 5/2011 | Georgi et al. | |
| 8,023,539 B2 | 9/2011 | Ueno et al. | |
| 8,156,284 B2 | 4/2012 | Votbach et al. | |
| 8,321,849 B2 | 11/2012 | Nickolls et al. | |
| 8,436,857 B2 | 5/2013 | Twilleager | |
| 8,508,612 B2* | 8/2013 | Cote | H04N 9/045 |
| | | | 348/222.1 |
| 8,543,843 B1 | 9/2013 | Cheng et al. | |
| 8,650,384 B2 | 2/2014 | Lee et al. | |
| 8,687,223 B2 | 4/2014 | Yamamoto | |
| 8,749,667 B2 | 6/2014 | Noraz et al. | |
| 8,786,614 B2 | 7/2014 | Curry et al. | |
| 8,797,323 B2 | 8/2014 | Salvi et al. | |
| 8,823,736 B2 | 9/2014 | Barringer et al. | |
| 8,970,884 B2 | 3/2015 | Tsui et al. | |
| 8,976,195 B1 | 3/2015 | Lindholm et al. | |
| 9,749,548 B2 | 8/2017 | Zhu et al. | |
| 2003/0005365 A1 | 1/2003 | Wilson | |
| 2005/0402712 | 12/2005 | Kaman et al. | |
| 2006/0044576 A1 | 3/2006 | Tabata et al. | |
| 2006/0228007 A1 | 10/2006 | Knee | |
| 2007/0028197 A1* | 2/2007 | Santoso | G06F 17/5045 |
| | | | 716/103 |
| 2007/0047828 A1 | 3/2007 | Ishii et al. | |
| 2007/0080969 A1* | 4/2007 | Yamaura | G06T 1/20 |
| | | | 345/535 |
| 2007/0156729 A1* | 7/2007 | Shaylor | G06F 5/065 |
| 2008/0111823 A1* | 5/2008 | Fan | G06T 1/60 |
| | | | 345/531 |
| 2008/0244222 A1 | 10/2008 | Supalov et al. | |
| 2008/0266302 A1 | 10/2008 | Andre et al. | |
| 2009/0002390 A1 | 1/2009 | Kuna | |
| 2009/0228677 A1 | 9/2009 | Liege | |
| 2009/0300621 A1 | 12/2009 | Mantor et al. | |
| 2009/0317009 A1* | 12/2009 | Ren | H04N 1/40 |
| | | | 382/239 |
| 2010/0122105 A1 | 5/2010 | Arsian et al. | |
| 2010/0182042 A1 | 7/2010 | Law et al. | |
| 2010/0188538 A1 | 7/2010 | Sugawa et al. | |
| 2010/0293214 A1 | 11/2010 | Longley | |
| 2011/0055495 A1 | 3/2011 | Wolford et al. | |
| 2011/0087867 A1 | 4/2011 | Jacobson et al. | |
| 2011/0125768 A1 | 5/2011 | Shibao | |
| 2011/0138371 A1 | 6/2011 | Tanabe et al. | |
| 2011/0153925 A1 | 6/2011 | Bains et al. | |
| 2012/0320070 A1 | 12/2012 | Arvo | |
| 2013/0027416 A1 | 1/2013 | Vaithianathan et al. | |
| 2013/0202051 A1 | 8/2013 | Zhou | |
| 2013/0243329 A1 | 9/2013 | Oro Garcia et al. | |
| 2013/0314428 A1* | 11/2013 | Chen | G06T 1/60 |
| | | | 345/531 |
| 2013/0318544 A1 | 11/2013 | Kuroda et al. | |
| 2014/0019486 A1 | 1/2014 | Majumdar | |
| 2014/0028876 A1 | 1/2014 | Mills | |
| 2014/0136816 A1 | 5/2014 | Krig | |
| 2014/0270478 A1 | 9/2014 | Chen et al. | |
| 2014/0282611 A1 | 9/2014 | Campbell et al. | |
| 2015/0086134 A1* | 3/2015 | Hameed | G06T 1/20 |
| | | | 382/279 |
| 2015/0106596 A1 | 4/2015 | Vorback et al. | |
| 2016/0210720 A1 | 7/2016 | Taylor | |
| 2016/0219225 A1 | 7/2016 | Zhu et al. | |
| 2017/0206627 A1 | 7/2017 | Zhu et al. | |

FOREIGN PATENT DOCUMENTS

| | | |
|---|---|---|
| JP | 2009545085 A | 12/2009 |
| JP | 2011-118752 | 6/2011 |
| JP | 2013090070 | 5/2013 |
| WO | WO 9409595 | 4/1994 |
| WO | WO 2007/071883 | 6/2007 |
| WO | WO 2008/024668 | 2/2008 |

OTHER PUBLICATIONS

International Preliminary Report on Patentability issued in International Application No. PCT/US2016/025385, dated Nov. 2, 2017, 8 pages.

International Preliminary Report on Patentability issued in International Application No. PCT/US2015/065564, dated Aug. 3, 2017, 10 pages.

"Multi output Scaler Reference Design" Altera Corporation. Application Note AN-648-1.0, Aug. 2012, 18 pages.

"ChimeraTM: The NVIDIA Computational Photography Architecture" Whitepaper, NVIDIA Corporation 2013, 15 pages.

Adams, et al. "The Frankencamera: An Experimental Platform for Computational Photography", ACM Transactions on Graphics, vol. 29, No. 4, Article 29, publication Jul. 2010, 12 pages.

Adobe Systems, "Adobe Photoshop CS6," released and on Sale in May 2012, pp. 1-2.

Ahn, et al., "Evaluating the Image Stream Architecture." In ACM SIGARCH Computer Architecture News, vol. 32, No. 2, IEEE Computer Society, Jun. 2004, 14 pages.

Arasan "Silicon His Announces New Image Signal Processor"Eindhoven, the Netherlands, May 16, 2006 http://www.design-reuse.com/news/13362/silicon-hive-image-signal-processor.html, 3 pages.

Balfour, et al., "An Energy-Efficient Processor Architecture for Embedded Systems" IEEE Computer Architecture Letters 7, No. 1 p. 29-32, May 2008.

Barry et al. "Always-On Vision Processing Unit for Mobile Applications," IEEE Micro, Mar./Apr. 2015, pp. 56-66.

Bolotoff, Paul V., "Alpha—The History in Facts and Comments" http://alasir.com/articies/a;pha_history/alpha_21164_21164pc.html, Last modification date Apr. 22, 2007,5 pages.

Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.

Cardells-Tormo et al., "Area-efficient 2-D Shift-variant Convolvers for FPGA-based Digital Image Processing," IEEE Workshop on Signal Processing Systems Design and Implementation. Nov. 2, 2005, 5 pages.

CEVA-MM3101: An Imaging-Optimized DSP Core Swings for an Embedded Vision Home Run http://www.bdti.com/insideDSP/2012/01/24CEVA, Jan. 19, 2012, 3 pages.

Chao et al., "Pyramid Architecture for 3840×2160 Quad Full High Definition 30 Frames/s Video Acquisition," IEEE Transactions on Circuits and Systems fior Video Technology, Nov. 1, 2010, 1 0 pages.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

(56) References Cited

OTHER PUBLICATIONS

Chen, et al., "DaDianNao: A Machine-Learning Supercomputer." 47m Annual IEEE/ACM International Symposium, pp. 609-622, IEEE, Dec. 2014.
Chenyun et al. "A Paradign Shift in Local Interconnect Technology Design in the Era of Nanoscale Multigate and Gate-All-Around Devices," IEEE Electron Device Letters, vol. 36, No. 3 pp. 274-26, Mar. 2015.
Clearspeed Whitepaper: CSX Processor Architecture, www.clearspeed.com, 2007, 16 pages.
Codrescu, et al., "Hexagon DSP: An Architecture Optimized for Mobile Multimedia and Communications." IEEE Micro vol. 34, Issue 2, pp. 34-43, Mar. 2014.
Daily, William J., "Computer architecture is all about interconnect." Proceedings of 8m International Symposium High-Pert. Comp. Architecture, Feb. 2002. 11 pages.
De Dinechin, et al., "A Clustered Manycore Processor Architecture for Embedded and Accelerated Applications." In High Performance Extreme Computing Conference (HPEC), IEEE, pp. 1-6, Sep. 2013.
DeVito, et al., "Terra: A Multi-Stage Language for High-Performance Computing", PLDI'13, Jun. 16-22, 2013, Seattle, Washington, 11 pages.
DeVito, et al.,"First-class Runtime Generation of High-Performance Types using Exotypes", PLD1'14, Jun. 9-11, ACM. 12 pages.
Dykes et al, "Communication and Computation Patterns of Large Scale Image Convolutions on Parallel Architectures," Parallel Processing Symposium, Jan. 1. 1994, 6 pages.
Eichenberger, et al., "Optimizing Compiler for the Cell Processor" PACT, Tuesday, Sep. 20, 2005, Part 1, pp. 1-16.
Eichenberger et al., "Optimizing Compiler for the Cell Processor" PACT, Tuesday, Sep. 20, 2005. Part 2, pp. 17-32.
EyeQ2TM, "Vision System on a Chip", Mobileye, Sep. 2007, 4 pages.
Ferreira et al. "More Efficient Terrain Viewshed Computation on Massive Datasets Using External Memory," ACM SIGPATIAL GIS, Nov. 6-9, 2012, pp. 494-497.
Farabet, et al., "Hardware Accelerated Convolutional Neural Networks for Synthetic Vision Systems," Proceedings of 201 O IEEE International Symposium, pp. 257-260, Jun. 2010.
Farabet, et al. "Neuflow: A Runtime Reconfigurable Dataflow Processor for Vision." IEEE Computer Society Conference, pp. 109-116, Jun. 2011.
Galal, et al., "FPU Generator for Design Space Exploration." 21st IEEE Symposium on Computer Arithmetic (ARITH), Apr. 2013. 1 O pages.
Gentile, et al., "Image Processing Chain for Digital Still Cameras Based on SIMPil Architecture," ICCP International Conference Workshops, pp. 215-222, IEEE, Jun. 2005.
Goldstein, et al., "PipeRench: A Coprocessor for Streaming Multimedia Acceleration", Carnegie Mellow University, Research Showcase @CMU, Appears in the 26th Annual International Symposium on Computer Architecture, May 1999, Atlanta, Georgia, 14 pages.
Gupta, et al., "A VLSI Architecture for Updating Raster-Scan Displays", Computer Graphics, vol. 15, No. 3, Aug. 1981, pp. 71-78.
Hameed, et al., "Understanding Sources of Inefficiency in General-Purpose Chips." ACM SIGARCH Computer Architecture News, vol. 38, No. 3, pp. 37-47, 2010.
Hanrahan, Pat, "Domain-Specific Languages for Heterogeneous GPU Computing", NVIDIA Technology Conference, Oct. 2, 2009, 30 pages.
Hegarty, et al., "Darkroom: Compiling High-Level Image Processing Code into Hardware Pipelines", ACM Transactions on Graphics (TOG)—Proceedings of ACM SIGGRAPH 2014, vol. 33 Issue 4, Jul. 2014, 11 pages.
Henretty, et al., "A Stencil Compiler for Short-Vector SMID Architectures", ACM, ICS'13, Jun. 10-14, 2013, Eugene, Oregon, pp. 13-24.
Horowitz, Mark, "Computing's Energy Problem: (and what we can do about it)", IEEE, International Solid-State Circuits Conference 2014, 46 pages.
Kapasi, et al. "The Imagine Stream Processor", IEEE, International Conference on Computer Design: VLSI in Computers and Processors (ICCD'02), 2002, 17 pages.
Khailany, et al., "A Programmable 512 GOPS Stream Processor for Signal, Image, and Video Processing", IEEE Journal of Solid-State Circuits, vol. 43. No. 1, pp. 202-213, Jan. 2008.
Khawam, et al., "The Reconfigurable Instruction Cell Array", IEEE Transactions on Very Large Scale Integration (VLSI) Systems, vol. 16, No. 1, Jan. 2008, pp. 75-85.
Khronos, SPIR 2.0 "Provisional Specification to Enable Compiler Innovation on Diverse Parallel Architectures", Aug. 11, 2014, 2 pages.
Levinthal, "Parallel Computers for Graphics Applications", ACM, 1987, pp. 193-198.
Levinthal, et al., "Chap—A SMID Graphics Processor", Computer Graphics, vol. 18, No. 3, Jul. 1984, pp. 77-82.
M.J. Duff, "CLIP 4: A Large Scale Integrated Circuit Array Parallel Processor," Proc. IEEE Int'l Joint Conf. Pattern Recognition, . . . Jan. 2004, pp. 728-733.
Mandak et al., "An Embedded Vision Engine (EVE) for Automotive Vision Processing." In Circuits and Systems (ISCAS), 2014 IEEE Symposium, pp. 49-52, IEEE, 2014.
Mcintosh-Smith, "A Next-Generation Many-Core Processor With Reliability, Fault Tolerance and Adaptive Power Management Features Optimized for Embedded and High Performance Computing Applications" in Proceedings of the High Performance Embedded Computing Conference (HPEC) 2008, pp. 1-2, 5.
Mody, et al., "High Performance and Flexible Imaging Sub-System." In Advances in Computing, Communications and Informatics (ICACCI), 2014 International Conference, pp. 545-548. IEEE, 2014.
Molnar, et al., "PixelFlow: High-Speed Rendering Using Image Composition" proceedings of Siggraph 92, Computer Graphics, 26, Jul. 2, 1992, 10 pages.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
MPPA—MANYCORE, Product Family Overview http://www/kalray.eu/IMG/pdf/FLYER_MPPA_MANYCORE-4.pdf, Feb. 2014, 2 pages.
Mghtingale, Edmund B., et al., "Helios: Heterogeneous Multiprocessing with Satellite Kernels," SOSP '09, Oct. 11-14, 2009, Big Sky, Montana, U.S.A., (Oct. 11, 2009), 14 pages.
NVIDIA—NVIDIA's Next Generation CUDA™ Compute Architecture: Kepler™, GK110/210, 2014, 23 pages http://international.download.nvidia.com/pdf.kepter.NVIDIA-Kepler-GK110-GK210-Architecutre-Whitepaper.pdf.
NVIDIA Tegra K1—A New Era in Mobile Computing—Whitepapers—Jan. 2014, 26 pages.
NVIDIA Tegra X1—NVIDIA's New Mobile Superchip—Whitepapers—Jan. 2015, 41 pages.
NVIDIA, "PTX:Parallel Thread Execution ISA Version 1.4", Aug. 23, 2010, 135 pages.
Olofsson, et al., "A 25 GFLOPS/Watt Software Programmable Floating Point Accelerator" High Performance Embedded Computing Conference, 2010, 2 pages.
Oosterhout, Optimized Pixel Template Image Correlator, Master Thesis, Aug. 19, 1992, 74 pages.
Parker, Richard, "Embedding Computer Vision in Electronic Devices: How New Hardware and Software Choices Have Changed the Designer's Approach", Future Technology Magazine, pp. 22-23, Feb. 2013.
PCT/US2015/065564—International Search Report and Written Opinion, dated Apr. 20, 2016, 15 pages.

(56) References Cited

OTHER PUBLICATIONS

Pelc, Oscar, "Multimedia Support in the i.MX31 and i.MX31 L Applications Processors", Freescale Semiconductor, Inc., Feb. 2006. http:cache.freescate.com/files/32bit/doc/white_paper/IMX31MULTIWP. pdf, 12 pages.

Pham, et al., "Neu Flow: Dataflow Vision Processing System-On-A,Chip." IEEE 55tn International Midwest Symposium, Aug. 2012, 4 pages.

Qadeer, et al., "Convolution Engine: Balancing Efficiency & Flexibility in Specialized Computing", ISCA '13 Tel-Aviv, Israel, ACM 2013, pp. 24-35.

Ragan-Kelley et al., "Halide: A Language and Compiler for Optimizing Parallelism Locality and Recomputation in Image Processing Pipelines", PLDI09, Jun. 16, 2013, 12 pages.

SemiWiki.com—New CEVA-ZM4 Vision IP Does Point clouds and More: Published Feb. 27, 2015, http://www.semiwiki.com/forum/content/4354-new-ceva-xm4-vision-ip-does-point-clouds-more.html.

S.F. Reddaway,"DAP—A Distributed Processor Array", ISCA '73 Proceedings of the First Ann. Symposium on Computer Architecture, pp. 61-65.

SCP2200: Image Cognition Processors Family [Product Brief]*, https://www.element14.com/community/docs/DOC-50990, Oct. 26, 2012, 2 pages.

SCP2200: Image Cognition Processors*, https://www.element14.com/community/docs/Doc-50987/I/sco2200-image-cognition-processors, Oct. 25, 2012, 2 pages.

Sedaghati, et al., "SIVEC: A Vector Instruction Extension for High Performance Stencil Computation," Parallel Architectures and Compilation Techniques, Oct. 10, 2011, 12 pages.

Shacham, et al.. "Stuart Memories Polymorphic Chip Multiprocessor", Proceedings of the 46$^{th}$ Design Automation Conference (OAC), San Francisco, CA, Jul. 2009.

Shacham, et al., "Rethinking Digital Design: Why Design Must Change", IEEE micro Magazine, Nov./Dec. 2010.

Shacham, Ofer, "Chip Multiprocessor Generator: Automatic Generation of Custom and Heterogeneous Complete Platforms" Dissertation—Stanford University, May 2011, 190 Pages Part 1.

Silicon Hive: "Silicon System Design of Media and Communications Applications", Jun. 13, 2007, 22 pages.

Spampinato, et al., "A Basic Linear Algebra Compiler", ACM, CG0'14, Feb. 15-19, 2014, Orlando Fl, pp. 23-32.

SPIR, The SPIR Specification, Version 2.0, Revision Date Jun. 5, 2014, 40 pages.

Stein, et al., "A Computer Vision System On a Chip: A Case Study From the Automotive Domain." IEEE Computer Society Conference, p. 130, 2005.

Stojanov, et al., "Abstracting Vector Architectures in Library Generators: Case Study Convolution Filters", ARRAY 14, ACM, Jun. 11, 2014, UK, pp. 14-19.

Stream Processors, Inc. Announces Storm-1 Family of Data-Parallel Digital Signal Processors. ISSCC 2007, Feb. 12, 2007, 3 pages. http://www.businesswire.com/news/home/20070212005230/en/Stream-Processors-Announces-Storm-1-Family-Data-Parallel-Digital.

Stream Processors, Inc., Company History—Foundational Work in Stream Processing initiated in 1995, https://en.wikipedia.org/wiki/Stream_Processors,_inc. 5 pages.

Tanabe, et al., "Visconti: multi-VLIW image Recognition Processor Based on Configurable Processor [obstacle detection applications]", Custom Integrated Circuits Conference, IEEE, 2003 http://ieeexplore.ieee.org/document/1249387/?arnumber=1249387&tag=1.

Van der Wal, et al., "The Acadia Vision Processor", IEEE proceedings of International Workshop on Computer Applications for Machine Perception, Sep. 2000, http://citeseerx.ist.pdu.edu/viewdoc/download?doi=10.1.1.32.3830&rep=rep1&type=pdf 10 pages.

Wahib et al., "Scalable Kernel Fusion for Memory-Bound GPU Applications," SC14: International Conference for High Performance Computing, Networking, Storage and Analysis, Nov. 16, 2014, 12 pages.

Yadav et al. "A Fast and Area Efficient 2-D Convolver for Real Time Image Processing," TENCON 2008, 2008 IEEE Region 10 Conference, Nov. 19-21, 2008, pp. 1-6.

Yu et al., "Optimizing data intensive window-based image processing on reconfigtnable hardware boards", IEEE, Nov. 2, 2005, 18 pages.

Zhou, Minhua, et al., "Parallel Tools in HEVC for High-Throughput Processing," Applications of Digital Processing, XXXV, Proc. of SPI, vol. 8499, (Jan. 1, 2012), pp. 1-13.

\* cited by examiner

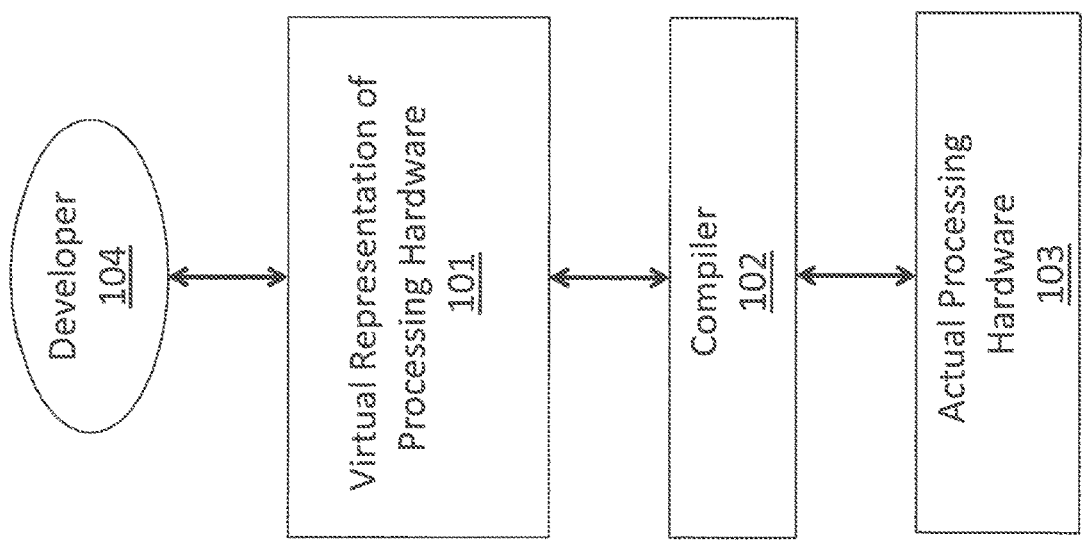

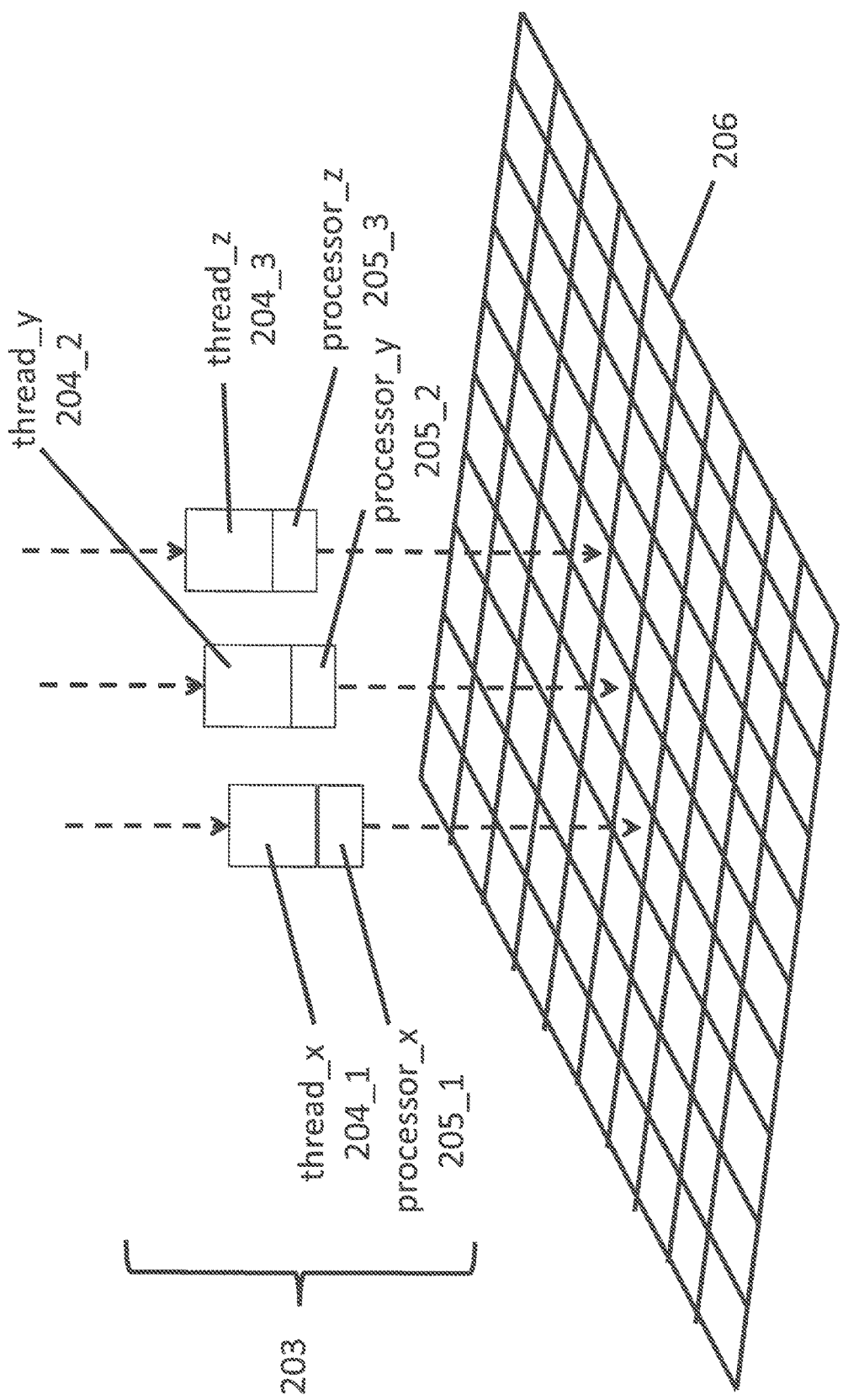

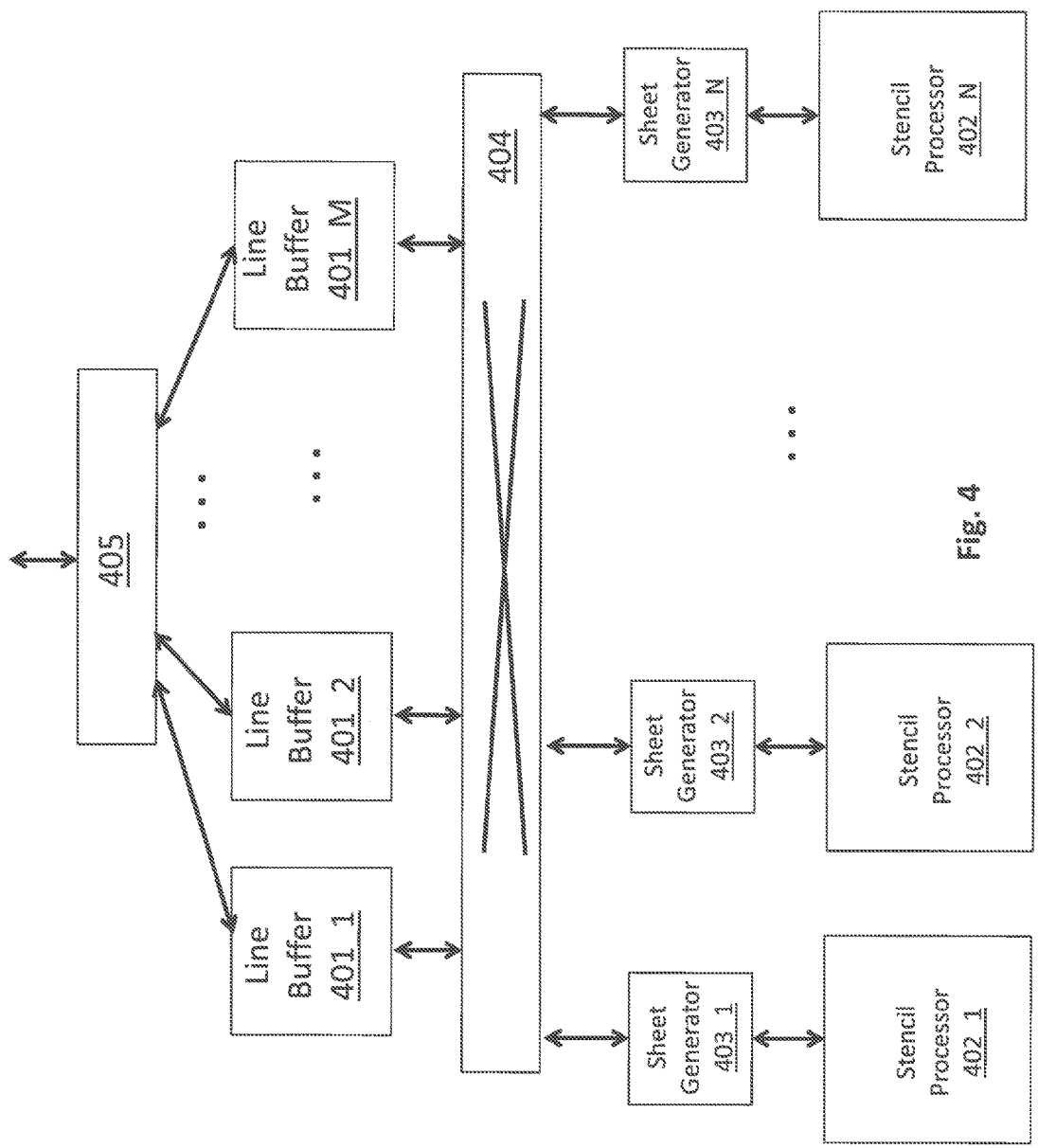

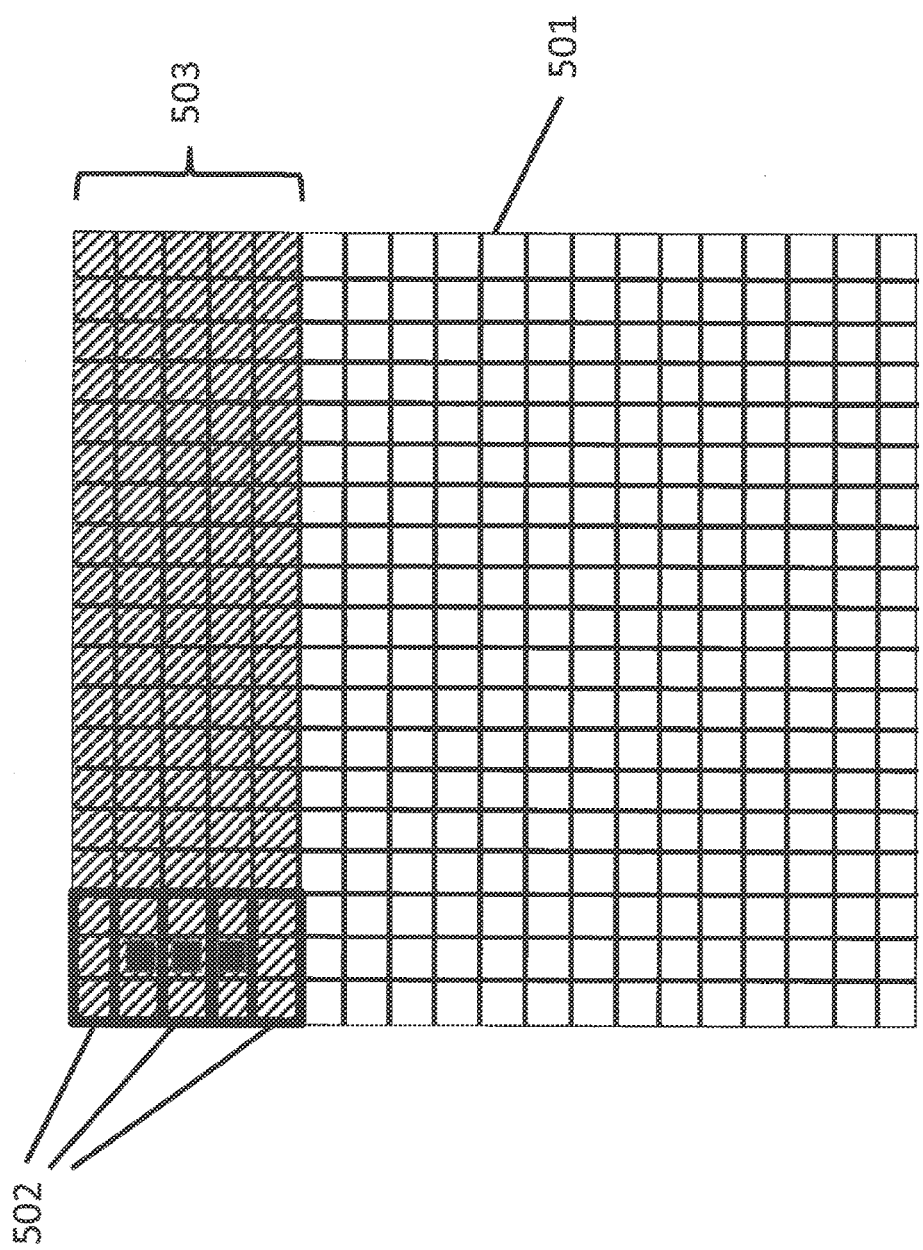

| Register | Description |
|---|---|
| LB_ENABLE | enable the line buffer interface unit |
| NUM_CHANNELS | number of channels in the line group being processed by the line buffer interface unit |
| NUM_CONSUMERS | number of consumer kernels that will access the line group being processed by the line buffer interface unit |
| ROW_WIDTH | number of pixels per row of the line group being processed by the line buffer interface unit |
| VB_ENABLE | enable virtually tall line buffer mode for the line group being processed by the line buffer interface unit |
| FB_ROWS | number of rows of a full line group for the line group being processed by the buffer interface unit |
| VB_ROWS | width of lower portions to be transferred in virtually tall line group mode |
| VB_COLS | height of lower portions to be transferred in virtually tall line group mode |
| NUM_REUSE_ROWS | number of reuse rows that have to be copied from virtually tall line group to full width buffer if virtually tall line group mode is enabled |
| FB_BASE_ADDRESS | base address in linear memory where the full width line group is stored |
| VB_BASE_ADDRESS | base address in linear memory where the virtually tall line group is stored |

921 — LB_ENABLE
922 — NUM_CHANNELS
923 — NUM_CONSUMERS
924 — ROW_WIDTH
925 — VB_ENABLE
926 — FB_ROWS
927 — VB_ROWS
928 — VB_COLS
929 — NUM_REUSE_ROWS
930 — FB_BASE_ADDRESS
931 — VB_BASE_ADDRESS

Fig. 9d

| Register | Description |
|---|---|
| NUM_CHANNELS | number of channels in the line group being processed by the line buffer interface unit |
| NUM_CONSUMERS | number of consumer kernels that will access the line group being processed by the line buffer interface unit |
| IMAGE_SIZE | the size of the image that line groups are constituent parts of |
| STENCIL_DIMENSION | the dimensions of the stencil that will process the line group |

LINE BUFFER UNIT FOR IMAGE PROCESSOR

CROSS REFERENCE TO RELATED APPLICATIONS

This application is a continuation of and claims priority to U.S. patent application Ser. No. 14/694,712, filed on Apr. 23, 2015, the entire contents of which are hereby incorporated by reference.

FIELD OF INVENTION

The field of invention pertains generally to image processing, and, more specifically, to a line buffer unit for an image processor.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

An apparatus is described that include a line buffer unit composed of a plurality of a line buffer interface units. Each line buffer interface unit is to handle one or more requests by a respective producer to store a respective line group in a memory and handle one or more requests by a respective consumer to fetch and provide the respective line group from memory. The line buffer unit has programmable storage space whose information establishes line group size so that different line group sizes for different image sizes are storable in memory.

LIST OF FIGURES

The following description and accompanying drawings are used to illustrate embodiments of the invention. In the drawings:

FIG. 1 shows various components of a technology platform;

FIG. 2b shows an embodiment of the structure of a kernel;

FIG. 4 shows an embodiment of an image processor hardware architecture;

FIGS. 5a, 5b, 5c, 5d and 5e depict the parsing of image data into a line group, the parsing of a line group into a sheet and the operation performed on a sheet with overlapping stencils;

FIGS. 9d and 9e depict embodiments of programmable register space of an image processor;

DETAILED DESCRIPTION i. Introduction

The description below describes numerous embodiments concerning a new image processing technology platform that provides a widely versatile application software development environment that uses larger blocks of data (e.g., line groups and sheets as described further below) to provide for improved power efficiency.

1.0 Application Software Development Environment a. Application and Structure of Kernels FIG. 1 shows a high level view of an image processor technology platform that includes a virtual image processing environment 101, the actual image processing hardware 103 and a compiler 102 for translating higher level code written for the virtual processing environment 101 to object code that the actual hardware 103 physically executes. As described in more detail below, the virtual processing environment 101 is widely versatile in terms of the applications that can be developed and is tailored for easy visualization of an application's constituent processes. Upon completion of the program code development effort by the developer 104, the compiler 102 translates the code that was written within the virtual processing environment 101 into object code that is targeted for the actual hardware 103.

Figure 2A:
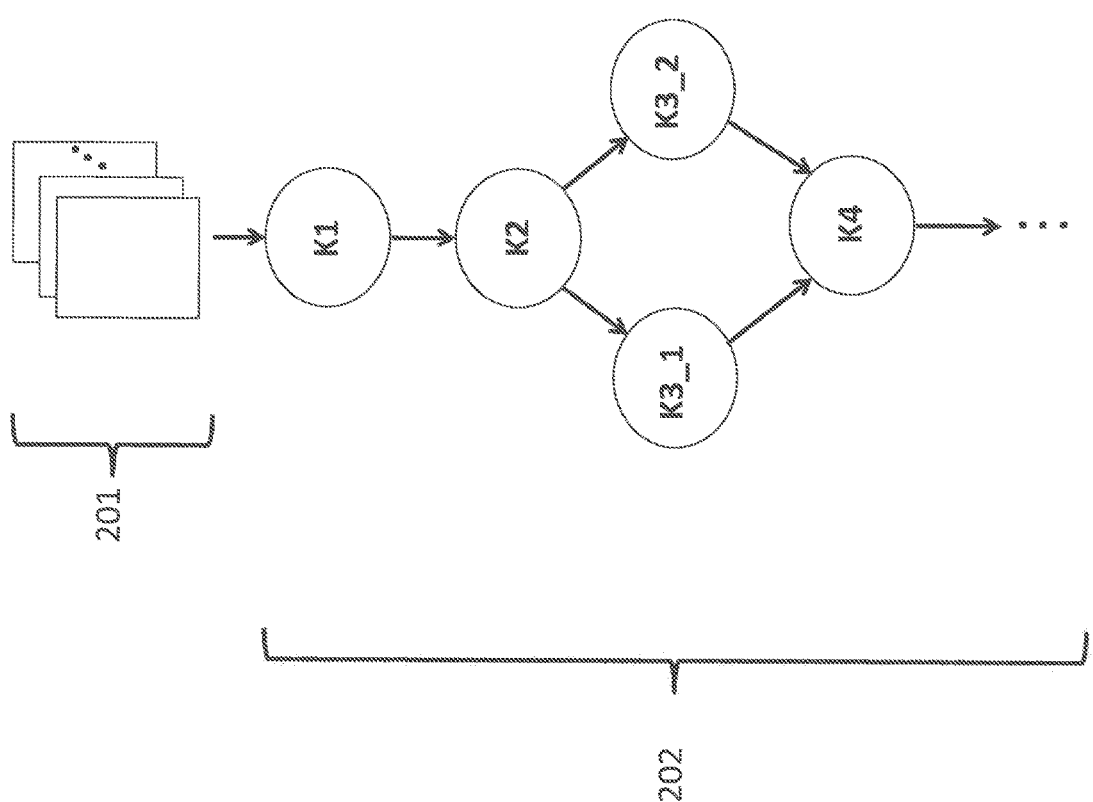
FIG. 2a shows an embodiment of application software built with kernels.

FIG. 2a shows an example of the structure and form that application software written within the virtual environment may take. As observed in FIG. 2a, the program code may be expected to process one or more frames of input image data 201 to effect some overall transformation on the input image data 201. The transformation is realized with the operation of one or more kernels of program code 202 that operate on the input image data in an orchestrated sequence articulated by the developer.

For example, as observed in FIG. 2a, the overall transformation is effected by first processing each input image with a first kernel K1. The output images produced by kernel K1 are then operated on by kernel K2. Each of the output images produced by kernel K2 are then operated on by kernel K3_1 or K3_2, The output images produced by kernel(s) K3_1/K3_2 are then operated on by kernel K4. Kernels K3_1 and K3_2 may be identical kernels designed to speed-up the overall processing by imposing parallel processing at the K3 stage, or, may be different kernels (e.g., kernel K3_1 operates on input images of a first specific type and kernel K3_2 operates on input images of a second, different type).

As such, the larger overall image processing sequence may take the form of a image processing pipeline or a directed acyclic graph (DAG) and the development environment may be equipped to actually present the developer with a representation of the program code being developed as such. Kernels may be developed by a developer individually and/or may be provided by an entity that supplies any underlying technology (such as the actual signal processor hardware and/or a design thereof) and/or by a third party (e.g., a vendor of kernel software written for the development environment). As such, it is expected that a nominal development environment will include a "library" of kernels that developers are free to "hook-up" in various ways to effect the overall flow of their larger development effort. Some basic kernels that are expected to be part of such a library may include kernels to provide any one or more of the following basic image processing tasks: convolutions, denoising, color space conversions, edge and corner detection, sharpening, white balance, gamma correction, tone mapping, matrix multiply, image registration, pyramid construction, wavelet transformation, block-wise discrete cosine and Fourier transformations.

FIG. 2b shows an exemplary depiction of the structure of a kernel 203 as may be envisioned by a developer. As observed in FIG. 2b, the kernel 203 can be viewed as a number of parallel threads of program code ("threads") 204 that are each operating on a respective underlying processor 205 where each processor 205 is directed to a particular location in an output array 206 (such as a specific pixel location in the output image that the kernel is generating). For simplicity only three processors and corresponding threads are shown in FIG. 2b. In various embodiments, every depicted output array location would have its own dedicated processor and corresponding thread. That is, a separate processor and thread can be allocated for each pixel in the output array.

As will be described in more detail below, in various embodiments, in the actual underlying hardware an array of execution lanes and corresponding threads operate in unison (e.g., in a Single Instruction Multiple Data(s) like fashion) to generate output image data for a portion of a "line group" of the frame currently being processed. A line group is a contiguous, sizable section of an image frame. In various embodiments, the developer may be conscious the hardware operates on line groups, or, the development environment may present an abstraction in which there is a separate processor and thread for, e.g., every pixel in the output frame (e.g., every pixel in an output frame generated by its own dedicated processor and thread). Regardless, in various embodiment, the developer understands the kernel to include an individual thread for each output pixel (whether the output array is visualized is an entire output frame or a section thereof).

As will be described in more detail below, in an embodiment the processors 205 that are presented to the developer in the virtual environment have an instruction set architecture (ISA) that, not only supports standard (e.g., RISC) opcodes, but also include specially formatted data access instructions that permit the developer to easily visualize the pixel by pixel processing that is being performed. The ability to easily define/visualize any input array location in combination with an entire ISA of traditional mathematical and program control opcodes allows for an extremely versatile programming environment that essentially permits an application program developer to define, ideally, any desired function to be performed on any sized image surface. For example, ideally, any mathematical operation can be readily programmed to be applied to any stencil size.

With respect to the data access instructions, in an embodiment the ISA of the virtual processors ("virtual ISA") include a special data load instruction and a special data store instruction. The data load instruction is able to read from any location within an input array of image data. The data store instruction is able to write to any location within the output array of image data. The latter instruction allows for easily dedicating multiple instances of the same processor to different output pixel locations (each processor writes to a different pixel in the output array). As such, for example, stencil size itself (e.g., expressed as a width of pixels and a height of pixels) can be made an easily programmable feature. Visualization of the processing operations is further simplified with each of the special load and store instructions having a special instruction format whereby target array locations are specified simplistically as X and Y coordinates.

Regardless, by instantiating a separate processor for each of multiples locations in the output array, the processors can execute their respective threads in parallel so that, e.g., the respective values for all locations in the output array are produced concurrently. It is noteworthy that many image processing routines typically perform the same operations on different pixels of the same output image. As such, in one embodiment of the development environment, each processor is presumed to be identical and executes the same thread program code. Thus, the virtualized environment can be viewed as a type of two-dimensional (2D), SIMD processor composed of a 2D array of, e.g., identical processors each executing identical code in lock-step.

Figure 3:
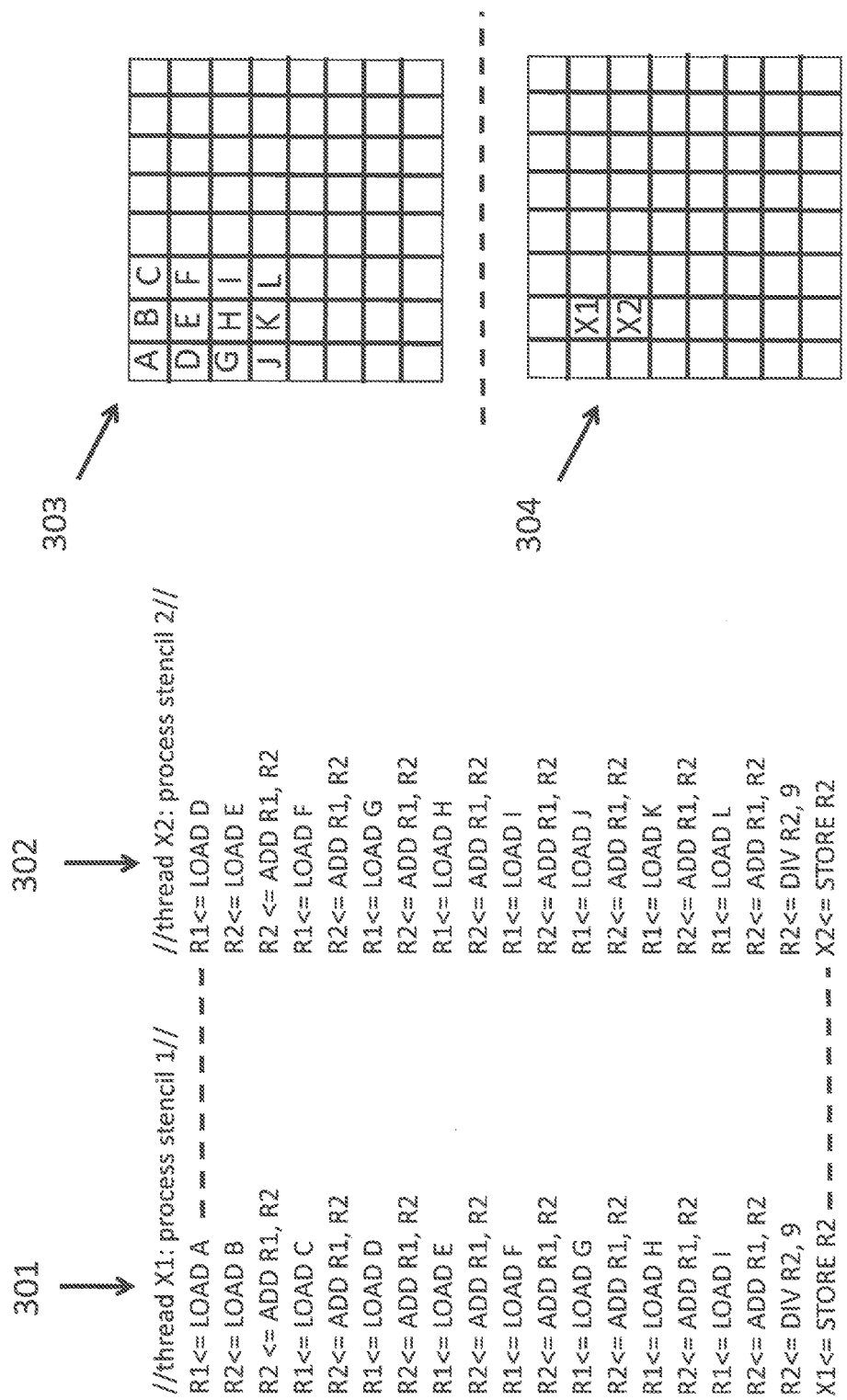
FIG. 3 shows an embodiment of the operation of a kernel.

FIG. 3 shows a more detailed example of the processing environment for two virtual processors that are processing identical code for two different pixel locations in an output array. FIG. 3 shows an output array 304 that corresponds to an output image being generated. Here, a first virtual processor is processing the code of thread 301 to generate an output value at location X1 of the output array 304 and a second virtual processor is processing the code of thread 302 to generate an output value at location X2 of the output array 304. Again, in various embodiments, the developer would understand there is a separate processor and thread for each pixel location in the output array 304 (for simplicity FIG. 3 only shows two of them). However, the developer in various embodiments need only develop code for one processor and thread (because of the SIMD like nature of the machine).

As is known in the art, an output pixel value is often determined by processing the pixels of an input array that include and surround the corresponding output pixel location. For example, as can be seen from FIG. 3, position X1 of the output array 304 corresponds to position E of the input array 303. The stencil of input array 303 pixel values that would be processed to determine output value X1 would therefore corresponds to input values ABCDEFGHI. Similarly, the stencil of input array pixels that would be processed to determine output value X2 would corresponds to input values DEFGHIJKL.

FIG. 3 shows an example of corresponding virtual environment program code for a pair of threads 301, 302 that could be used to calculate output values X1 and X2, respectively. In the example of FIG. 3 both pairs of code are identical and average a stencil of nine input array values to determine a corresponding output value. The only difference between the two threads is the variables that are called up from the input array and the location of the output array that is written to. Specifically, the thread that writes to output location X1 operates on stencil ABCDEFGHI and the thread that writes to output location X2 operates on stencil DEFGHIJKL.

As can be seen from the respective program code from the pair of threads 301, 302, each virtual processor at least includes internal registers R1 and R2 and at least supports the following instructions: 1) a LOAD instruction from the input array into R1; 2) a LOAD instruction from the input array into R2; 3) an ADD instruction that adds the contents of R1 and R2 and places the resultant in R2; 4) a DIV instruction that divides the value within R2 by immediate operand 9; and, 5) a STORE instruction the stores the contents of R2 into the output array location that the thread is dedicated to. Again, although only two output array locations and only two threads and corresponding processors are depicted in FIG. 3, conceivably, every location in the output array could be assigned a virtual processor and corresponding thread that performs these functions. In various embodiments, in keeping with the SIMD-like nature of the processing environment, the multiple threads execute in isolation of one another. That is, there is no thread-to-thread communication between virtual processors (one SIMD channel is preventing from crossing into another SIMD channel).

b. Virtual Processor Memory Model

In various embodiments, a pertinent feature of the virtual processors is their memory model. As is understood in the art, a processor reads data from memory, operates on that data and writes new data back into memory. A memory model is the perspective or view that a processor has of the manner in which data is organized in memory. In an embodiment, the memory model of the virtual processors includes both input and output array regions. Input pixel values for threads are stored in the input array region and output pixel values generated by threads are stored in the output array region.

In an embodiment, a novel memory addressing scheme is used to define which particular input values are to be called in from an input array portion of the virtual processor's memory model. Specifically, a "position relative" addressing scheme is used that defines the desired input data with X, Y coordinates rather than a traditional linear memory address. As such, the load instruction of the virtual processors' ISA includes an instruction format that identifies a specific memory location within the input array with an X component and a Y component. As such, a two-dimensional coordinate system is used to address memory for input values read from the input array.

The use of a position relative memory addressing approach permits the region of an image that a virtual processor is operating on to be more readily identifiable to a developer. As mentioned above, the ability to easily define/visualize any input array location in combination with an entire ISA of traditional mathematical and program control opcodes allows for an extremely versatile programming environment that essentially permits an application program developer to readily define, ideally, any desired function to be performed on any sized image surface. Various instruction format embodiments for instructions that adopt a position relative addressing scheme, as well as embodiments of other features of the supported ISA, are described in more detail further below.

The output array contains the output image data that the threads are responsible for generating. The output image data may be final image data such as the actual image data that is presented on a display that follows the overall image processing sequence, or, may be intermediate image data that a subsequent kernel of the overall image processing sequence uses as its input image data information. Again, typically virtual processors do not compete for same output data items because they write to different pixel locations of the output image data during a same cycle.

In an embodiment, the position relative addressing scheme is also used for writes to the output array. As such, the ISA for each virtual processor includes a store instruction whose instruction format defines a targeted write location in memory as a two-dimensional X, Y coordinate rather than a traditional random access memory address.

2.0 Hardware Architecture Embodiments a. Image Processor Hardware Architecture and Operation FIG. 4 shows an embodiment of an architecture 400 for an image processor implemented in hardware. The image processor may be targeted, for example, by a compiler that converts program code written for a virtual processor within a simulated environment into program code that is actually executed by the hardware processor. As observed in FIG. 4, the architecture 400 includes a plurality of line buffer units 401_1 through 401_M interconnected to a plurality of stencil processor units 402_1 through 402_N and corresponding sheet generator units 403_1 through 403_N through a network 404 (e.g., a network on chip (NOC) including an on chip switch network, an on chip ring network or other kind of network). In an embodiment, any line buffer unit may connect to any sheet generator and corresponding stencil processor through the network 404.

In an embodiment, program code is compiled and loaded onto a corresponding stencil processor 402 to perform the image processing operations earlier defined by a software developer (program code may also be loaded onto the stencil processor's associated sheet generator 403, e.g., depending on design and implementation). In at least some instances an image processing pipeline may be realized by loading a first kernel program for a first pipeline stage into a first stencil processor 402_1, loading a second kernel program for a second pipeline stage into a second stencil processor 402_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 402_1, 402_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 405 and passed to one or more of the line buffer units 401 on a frame by frame basis. A particular line buffer unit parses its frame of image data into a smaller region of image data, referred to as a "a line group", and then passes the line group through the network 404 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 401_1 which parses the image data into line groups and directs the line groups to the sheet generator 403_1 whose corresponding stencil processor 402_1 is executing the code of the first kernel in the pipeline/DAG. Upon completion of operations by the stencil processor 402_1 on the line groups it processes, the sheet generator 403_1 sends output line groups to a "downstream" line buffer unit 401_2 (in some use cases the output line group may be sent_back to the same line buffer unit 401_1 that earlier had sent the input line groups).

One or more "consumer" kernels that represent the next stage/operation in the pipeline/DAG executing on their own respective other sheet generator and stencil processor (e.g., sheet generator 403_2 and stencil processor 402_2) then receive from the downstream line buffer unit 401_2 the image data generated by the first stencil processor 402_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 402 is designed to simultaneously operate on multiple overlapping stencils of image data. The multiple overlapping stencils and internal hardware processing capacity of the stencil processor effectively determines the size of a sheet. Here, within a stencil processor 402, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor 402. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 5a through 5e illustrate at a high level embodiments of both the parsing activity of a line buffer unit 401, the finer grained parsing activity of a sheet generator unit 403 as well as the stencil processing activity of the stencil processor 402 that is coupled to the sheet generator unit 403.

FIG. 5a depicts an embodiment of an input frame of image data 501. FIG. 5a also depicts an outline of three overlapping stencils 502 (each having a dimension of 3 pixels×3 pixels) that a stencil processor is designed to operate over. The output pixel that each stencil respectively generates output image data for is highlighted in solid black. For simplicity, the three overlapping stencils 502 are depicted as overlapping only in the vertical direction. It is pertinent to recognize that in actuality a stencil processor may be designed to have overlapping stencils in both the vertical and horizontal directions.

Because of the vertical overlapping stencils 502 within the stencil processor, as observed in FIG. 5a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 401 is responsible for parsing a line group of input image data from an incoming frame that is sufficient for the stencil processors to operate over for an extended number of upcoming cycles. An exemplary depiction of a line group is illustrated as a shaded region 503. In an embodiment, as described further below, the line buffer unit 401 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 503 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

Figure 5B:
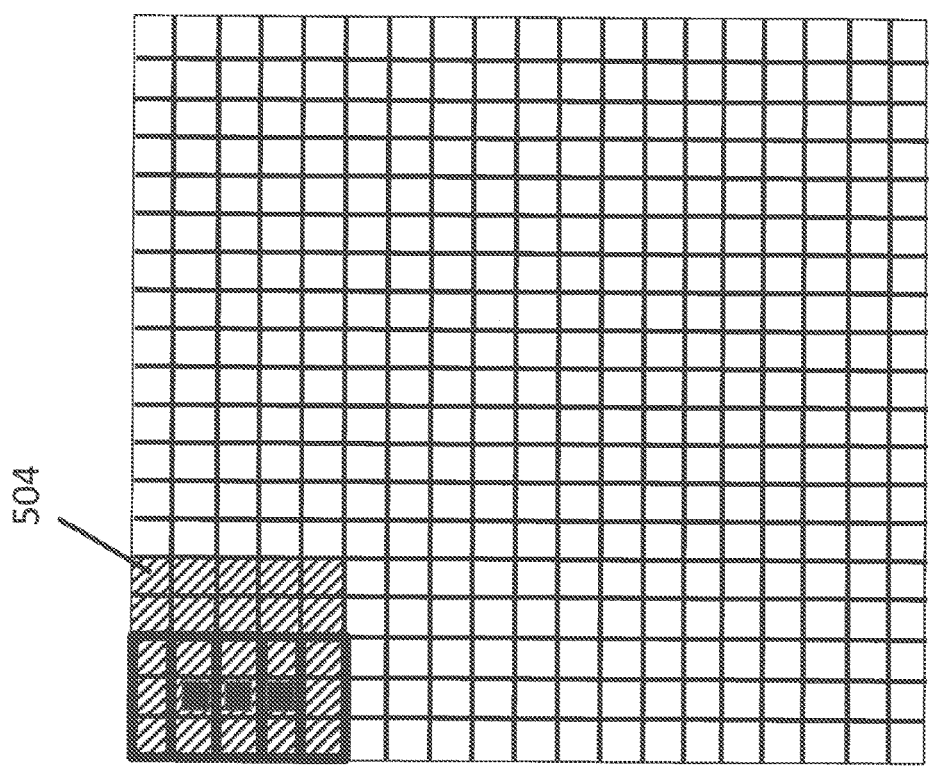
Figure 5C:
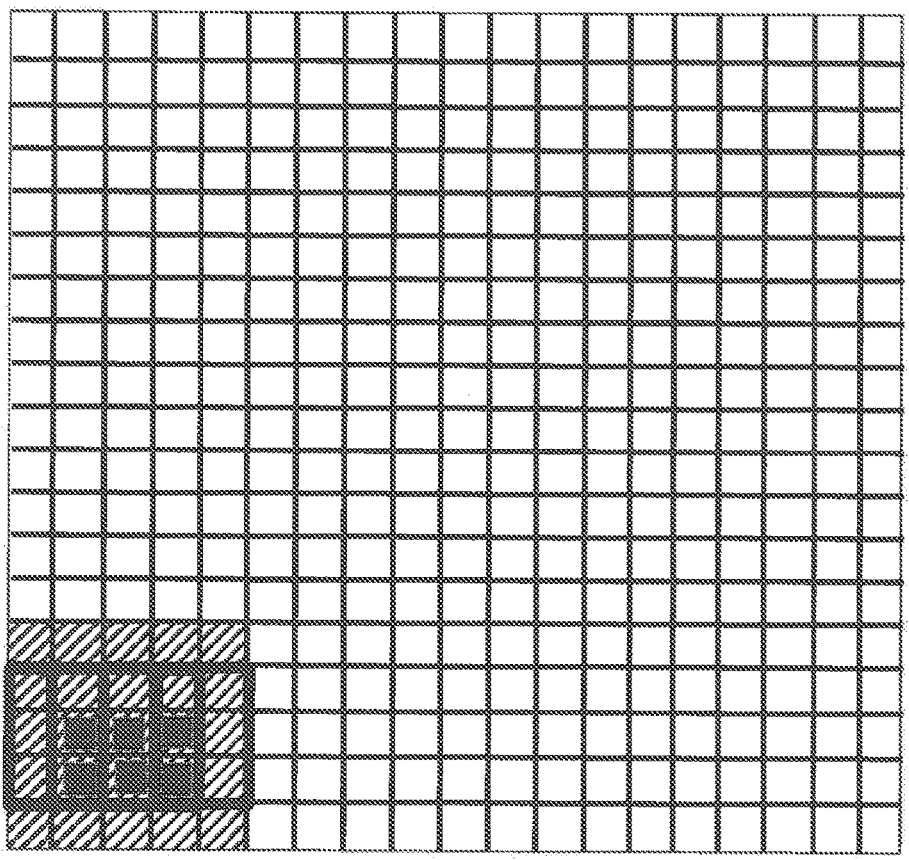
Figure 5D:
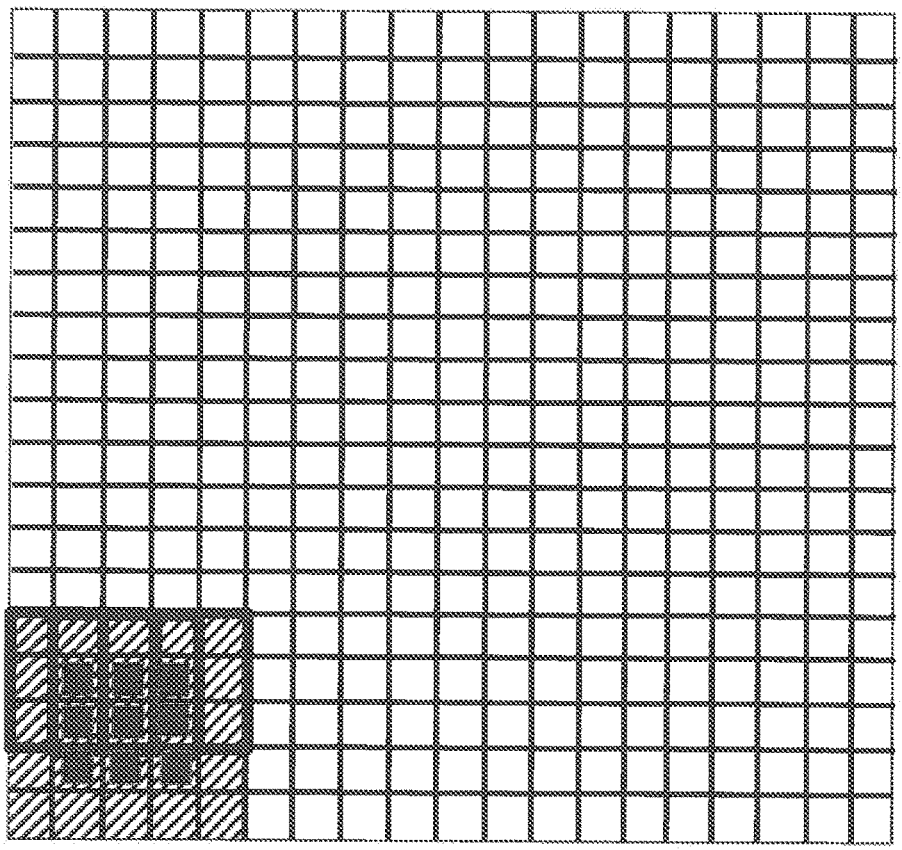

Thus, as observed in FIG. 5b, the sheet generator parses an initial sheet 504 from the line group 503 and provides it to the stencil processor (here, the sheet of data corresponds to the shaded region that is generally identified by reference number 504). As observed in FIGS. 5c and 5d, the stencil processor operates on the sheet of input image data by effectively moving the overlapping stencils 502 in a left to right fashion over the sheet. As of FIG. 5d, the number of pixels for which an output value could be calculated from the data within the sheet is exhausted (no other pixel positions can have an output value determined from the information within the sheet). For simplicity the border regions of the image have been ignored.

Figure 5E:
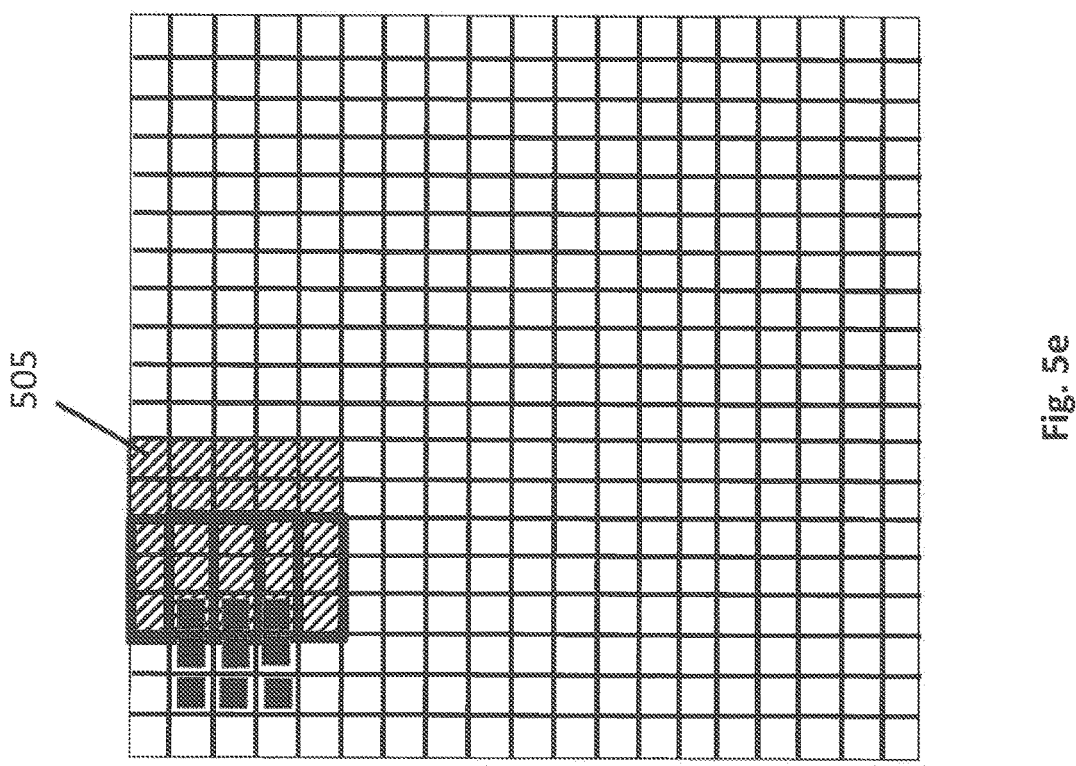

As observed in FIG. 5e the sheet generator then provides a next sheet 505 for the stencil processor to continue operations on. Note that the initial positions of the stencils as they begin operation on the next sheet is the next progression to the right from the point of exhaustion on the first sheet (as depicted previously in FIG. 5d). With the new sheet 505, the stencils will simply continue moving to the right as the stencil processor operates on the new sheet in the same manner as with the processing of the first sheet.

Note that there is some overlap between the data of the first sheet 504 and the data of the second sheet 505 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 6:
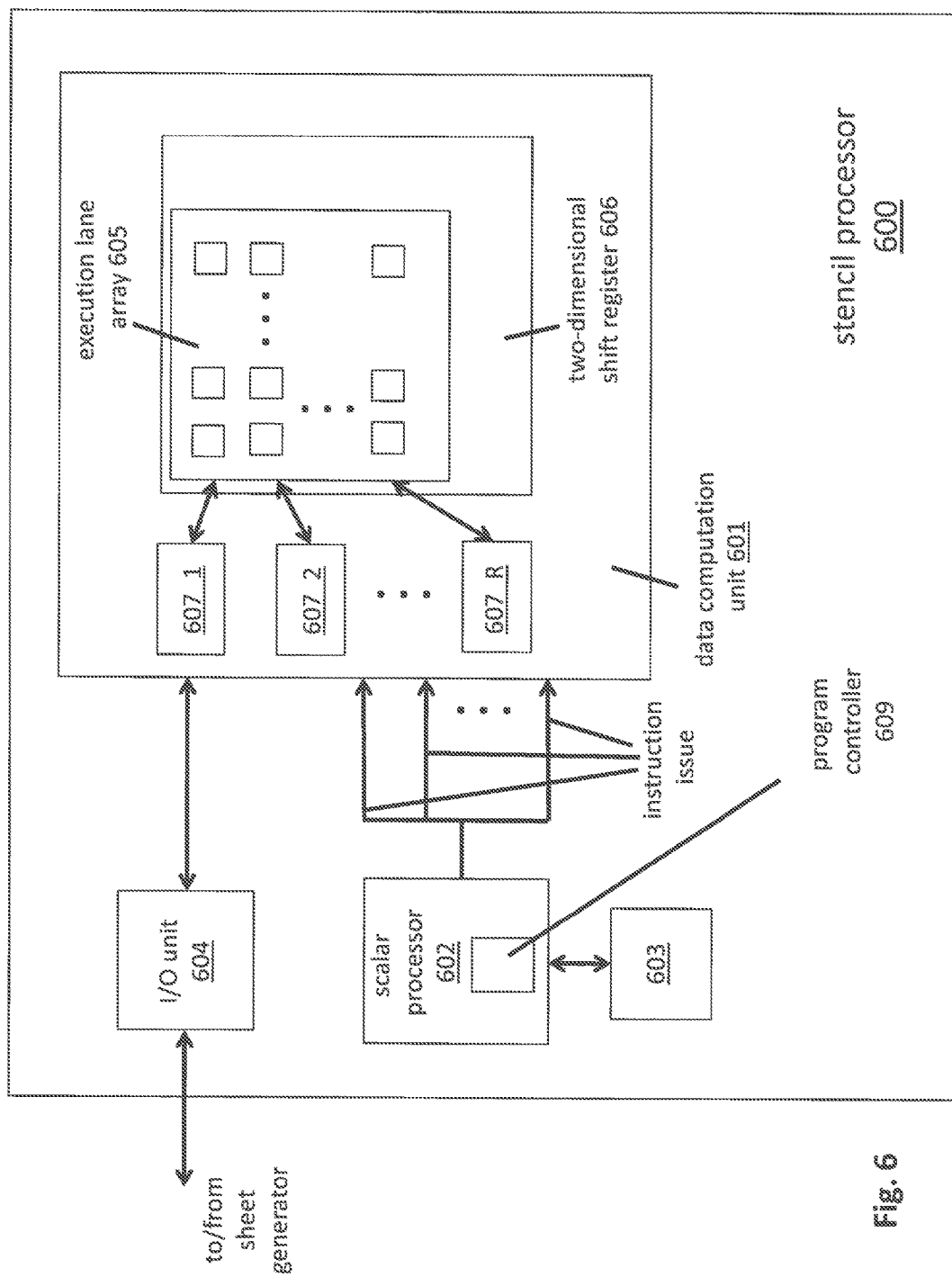
FIG. 6 shows an embodiment of a stencil processor.

FIG. 6 shows an embodiment of a stencil processor architecture 600. As observed in FIG. 6, the stencil processor includes a data computation unit 601, a scalar processor 602 and associated memory 603 and an I/O unit 604. The data computation unit 601 includes an array of execution lanes 605, a two-dimensional shift array structure 606 and separate random access memories 607 associated with specific rows or columns of the array.

The I/O unit 604 is responsible for loading "input" sheets of data received from the sheet generator into the data computation unit 601 and storing "output" sheets of data from the stencil processor into the sheet generator. In an embodiment the loading of sheet data into the data computation unit 601 entails parsing a received sheet into rows/columns of image data and loading the rows/columns of image data into the two dimensional shift register structure 606 or respective random access memories 607 of the rows/columns of the execution lane array (described in more detail below). If the sheet is initially loaded into memories 607, the individual execution lanes within the execution lane array 605 may then load sheet data into the two-dimensional shift register structure 606 from the random access memories 607 when appropriate (e.g., as a load instruction just prior to operation on the sheet's data). Upon completion of the loading of a sheet of data into the register structure 606 (whether directly from a sheet generator or from memories 607), the execution lanes of the execution lane array 605 operate on the data and eventually "write back" finished data as a sheet directly back to the sheet generator, or, into the random access memories 607. If the later the I/O unit 604 fetches the data from the random access memories 607 to form an output sheet which is then forwarded to the sheet generator.

The scalar processor 602 includes a program controller 609 that reads the instructions of the stencil processor's program code from scalar memory 603 and issues the instructions to the execution lanes in the execution lane array 605. In an embodiment, a single same instruction is broadcast to all execution lanes within the array 605 to effect a SIMD-like behavior from the data computation unit 601. In an embodiment, the instruction format of the instructions read from scalar memory 603 and issued to the execution lanes of the execution lane array 605 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 605).

The combination of an execution lane array 605, program controller 609 and two dimensional shift register structure 606 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 605, the random access memories 607 may also keep one or more look-up tables. In various embodiments one or more scalar look-up tables may also be instantiated within the scalar memory 603.

A scalar look-up involves passing the same data value from the same look-up table from the same index to each of the execution lanes within the execution lane array 605. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 605 during a the same clock cycle.

3.0 Line Buffer Unit Embodiments a. Line Buffer Unit Overview

Recall from the discussion above in Section 1.0 that in various embodiments, program code that is written for the hardware platform is written with a unique virtual code that includes an instruction set having load and store instructions whose instruction format identifies input and output array locations as, e.g., X,Y coordinates. In various implementations, the X,Y coordinate information may actually be programmed into the hardware platform and recognized/understood by various ones of its components. This stands apart from, for example, translating the X,Y coordination (e.g., within the compiler) into different information. For example, in the case of the two-dimensional shift register structure within the stencil processor, the X,Y coordinate information is translated into register shift movements. By contrast, other parts of the hardware platform may specifically receive and comprehend the X,Y coordinate information originally expressed at the higher, virtual code level.

Figure 7:
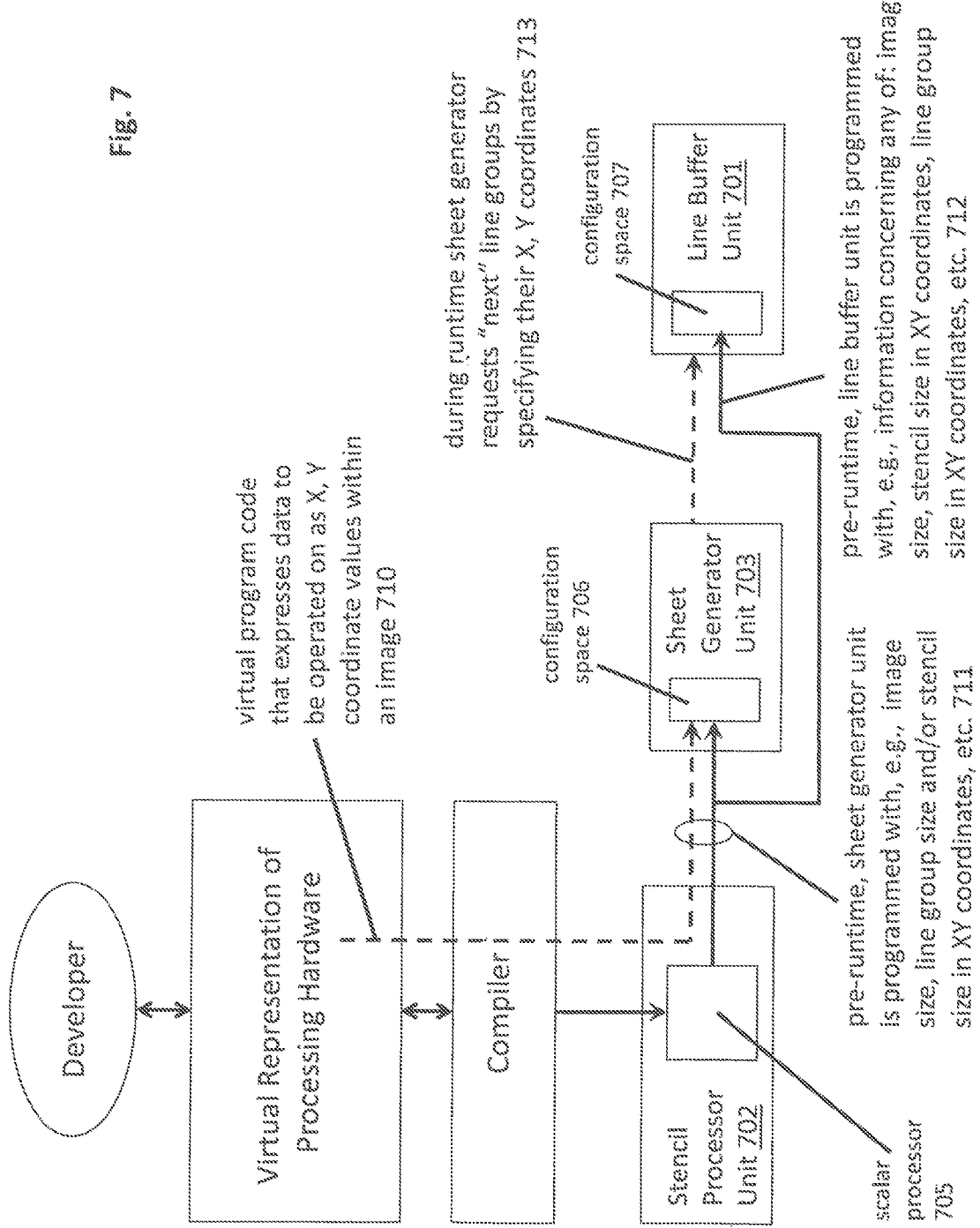
FIG. 7 shows an embodiment of the configuration and programming of an image processor

As observed in FIG. 7, as described in Section 1.0, a program code developer expresses data locations as X,Y coordinates with the special instruction format at the virtual code level 710. During the compilation stage, the virtual code is translated into program code that is actually processed by the hardware (object code) and corresponding configuration information that is loaded into the hardware's configuration (e.g., register) space. As observed in FIG. 7, in an embodiment, the object code for a particular kernel is loaded into the program space of the stencil processor's scalar processor 705.

As part of the configuration process, configuration software executing on the scalar processor 705 loads the appropriate configuration information 711, 712 into both the sheet generator unit 703 that is coupled to the stencil processor 702, and, the line buffer unit 701 that will generate new sheets for the stencil processor 702 to operate on, or, receive processed sheets generated by the stencil processor 702. Here, generally, sheets can still be contemplated in terms of X,Y coordinates of an overall image. That is, once an image or frame is defined (e.g., in terms of number of pixels per row, number of rows, number of pixels per column and number of columns), any portion or position of the image can still be referred to with X,Y coordinates.

As such, in various embodiments, either or both of the sheet generator unit 703 and line buffer unit 701 are configured with information 711, 712 within their respective configuration space 706, 707 that establishes an informational platform from which specific locations and/or regions (e.g., line groups, sheets) of an image or frame are identified in X,Y coordinates. In various implementations/uses, the X,Y coordinates may be the same X,Y coordinates expressed at the virtual code level.

Examples of such information include, e.g., number of active line groups in the line buffer unit, image size for each line group (e.g., as a set of four X, Y coordinates (one for each corner) or a pair of X, Y coordinates (one for a lower nearer corner and one for an upper farther corner)), absolute image width and image height, stencil size (expressed as X, Y values that define the size of a single stencil and/or the area of the overlapping stencils of the stencil processor), sheet and/or line group size (e.g., specified in same terms as an image size but having smaller dimensions), etc. Additionally, the line buffer unit 701 at least may be programmed with additional configuration information such as the number of producer kernels writing and the number of consumer kernels reading the line groups that are managed by the line buffer unit 701. The number of channels and/or the dimensions associated with the image data are also typically included as configuration information.

Figure 8:
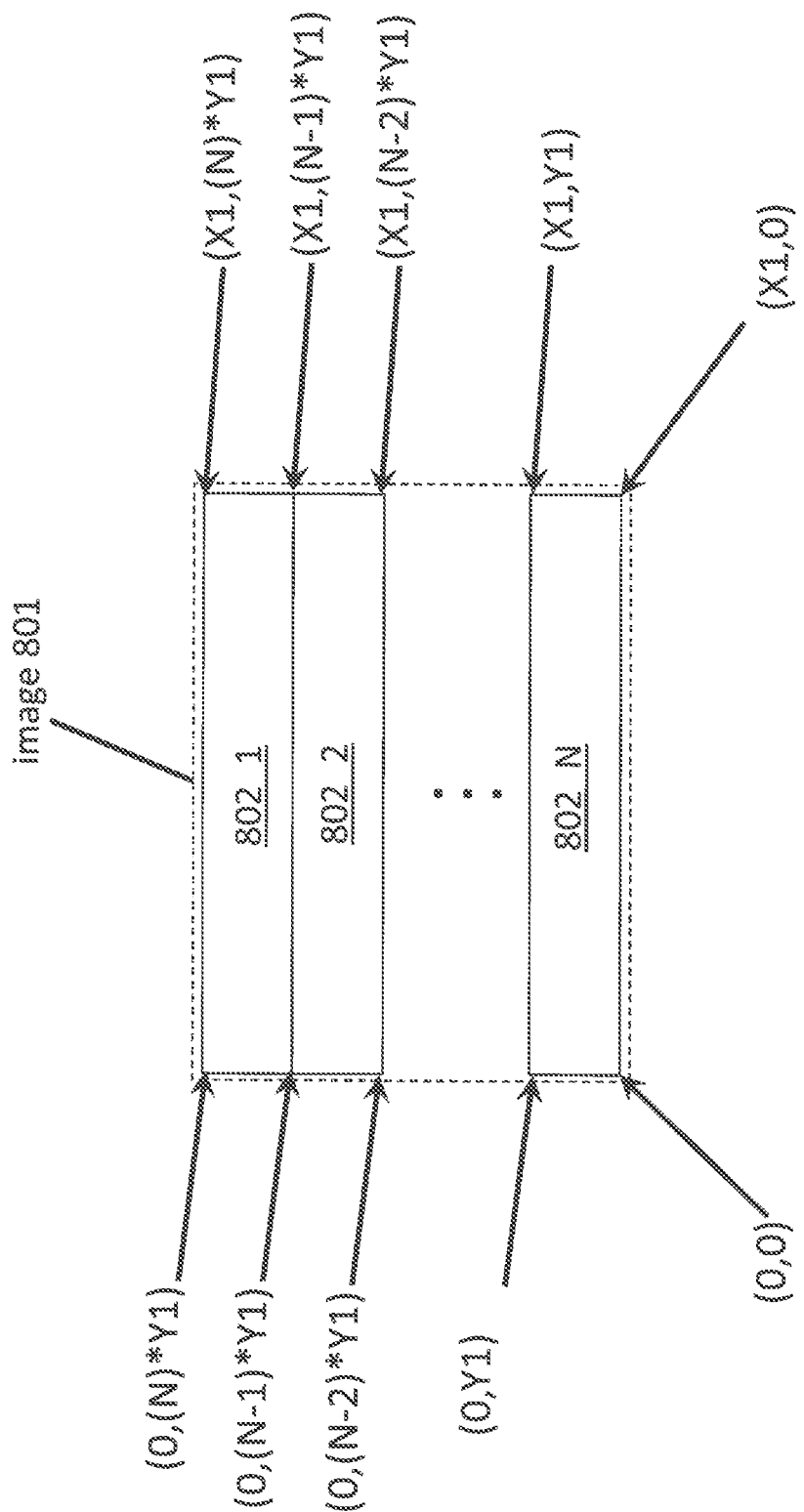
FIG. 8 shows an image frame composed of line groups.

FIG. 8 depicts the use of X,Y coordinates to define, as just one example, line groups within an image. Here, N line groups 801_1, 801_2, . . . 801_N are observable within an image 801. As can be seen from FIG. 8, each line group can be readily defined by reference to X, Y coordinates within the image that define, e.g., one or more of a line group's corner points. As such, in various embodiments, a line group's name or other data structure used to define a particular line group may include X, Y coordinate locations associated with the line group in order to particularly identify it.

Referring briefly back to FIG. 7, note that FIG. 7 shows that during runtime, a sheet generator 703 may request a "next" line group (or portion of a line group) from the line buffer unit 701 by, e.g., including X, Y coordinate information that defines the desired data region. FIG. 8 shows nominal "full width" line groups composed only of complete rows of image data. In an alternative configuration referred to as "virtually-tall", described in more detail further below, the line buffer unit 701 initially passes only a first upper portion of a line group as full width rows of image data. The subsequent lower rows of the line group are then specifically requested for by the sheet generator in contiguous chunks that are less than a full width row and are separately requested for. As such, multiple requests are made by the sheet generator in order to obtain the full line group. Here, each such request may define a next lower portion by X, Y coordinates that are attributable to the next lower portion.

Figure 9A:
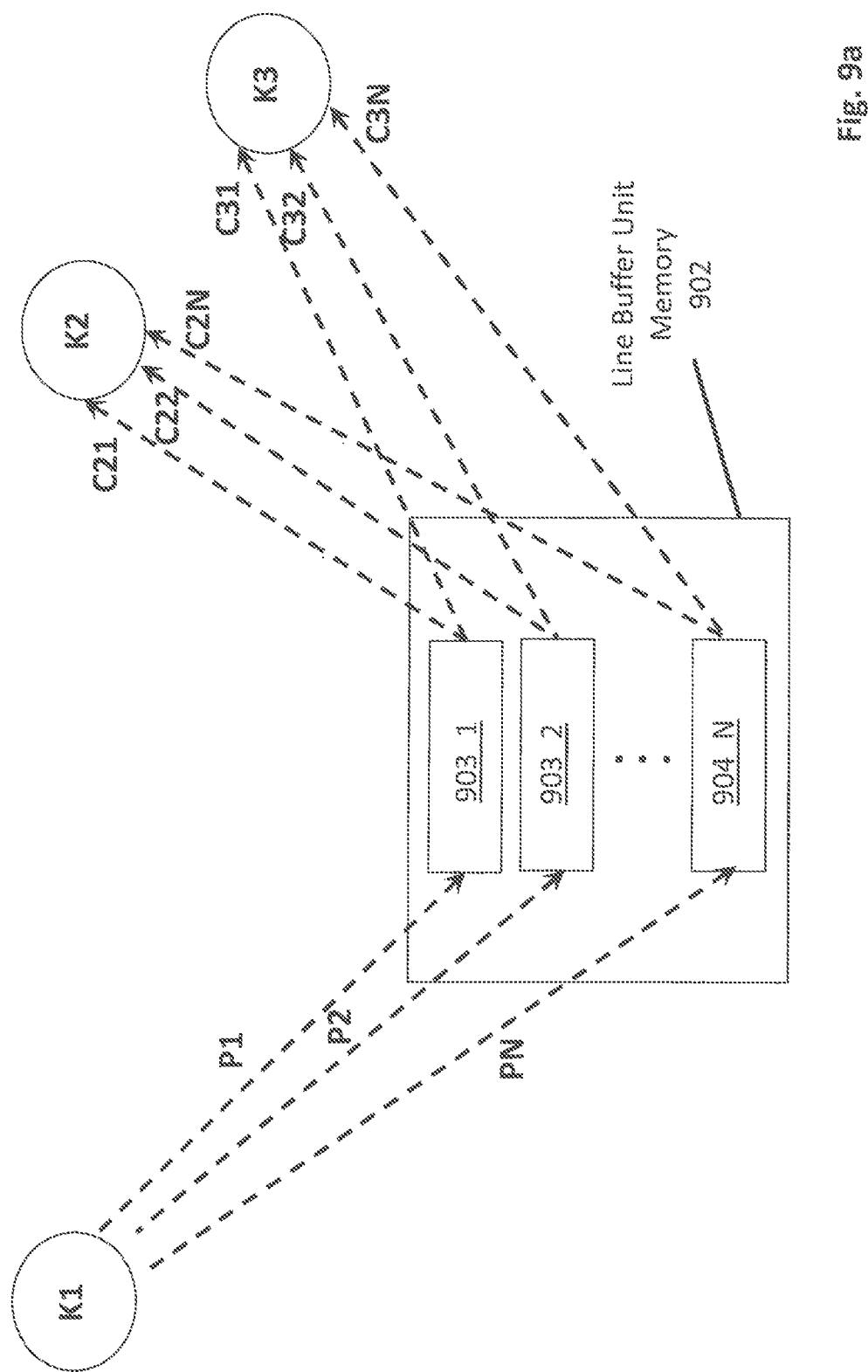
FIGS. 9a, 9b and 9c depict design and operational embodiments of a line buffer unit.
Figure 9B:
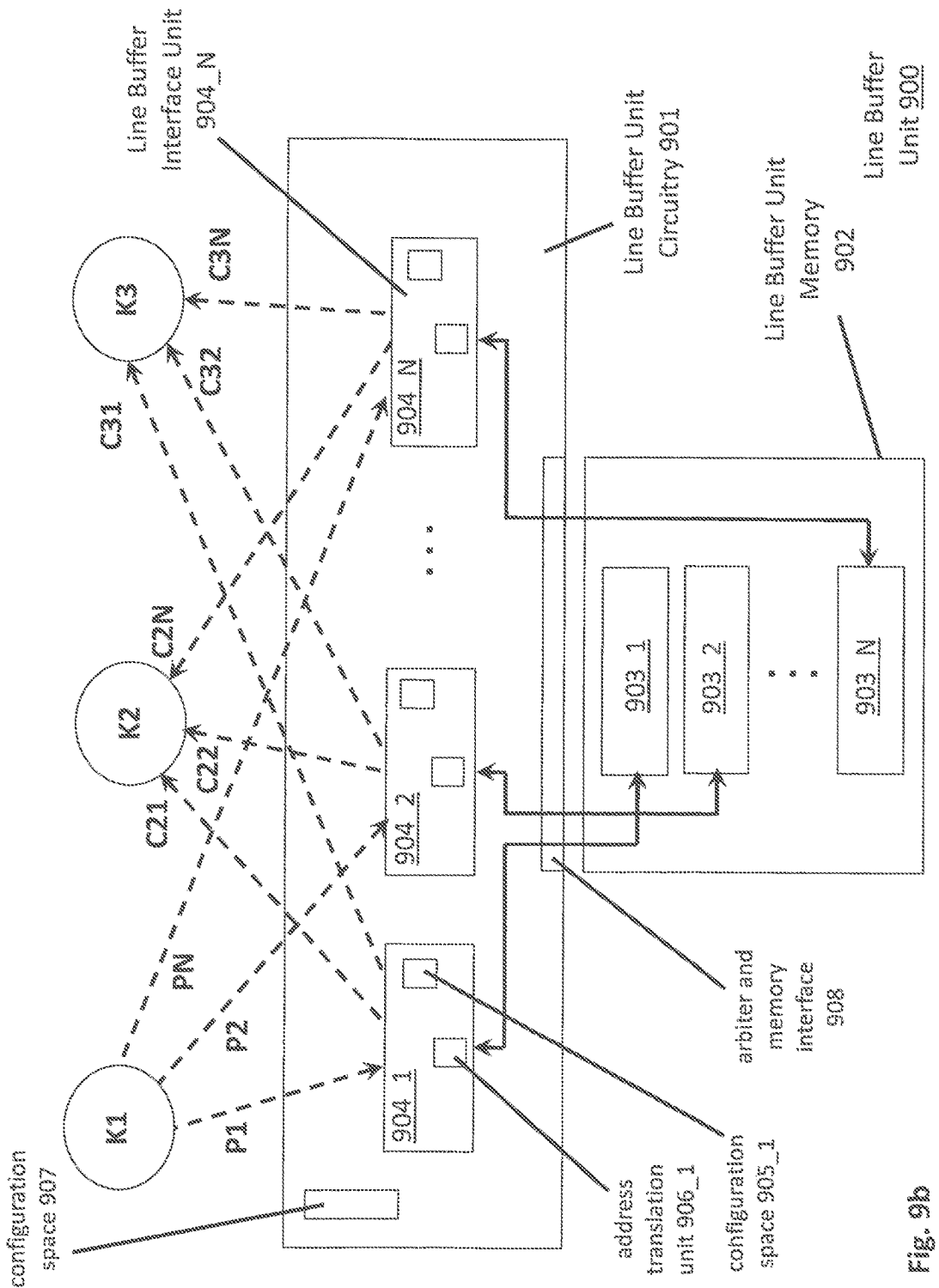
Figure 9C:
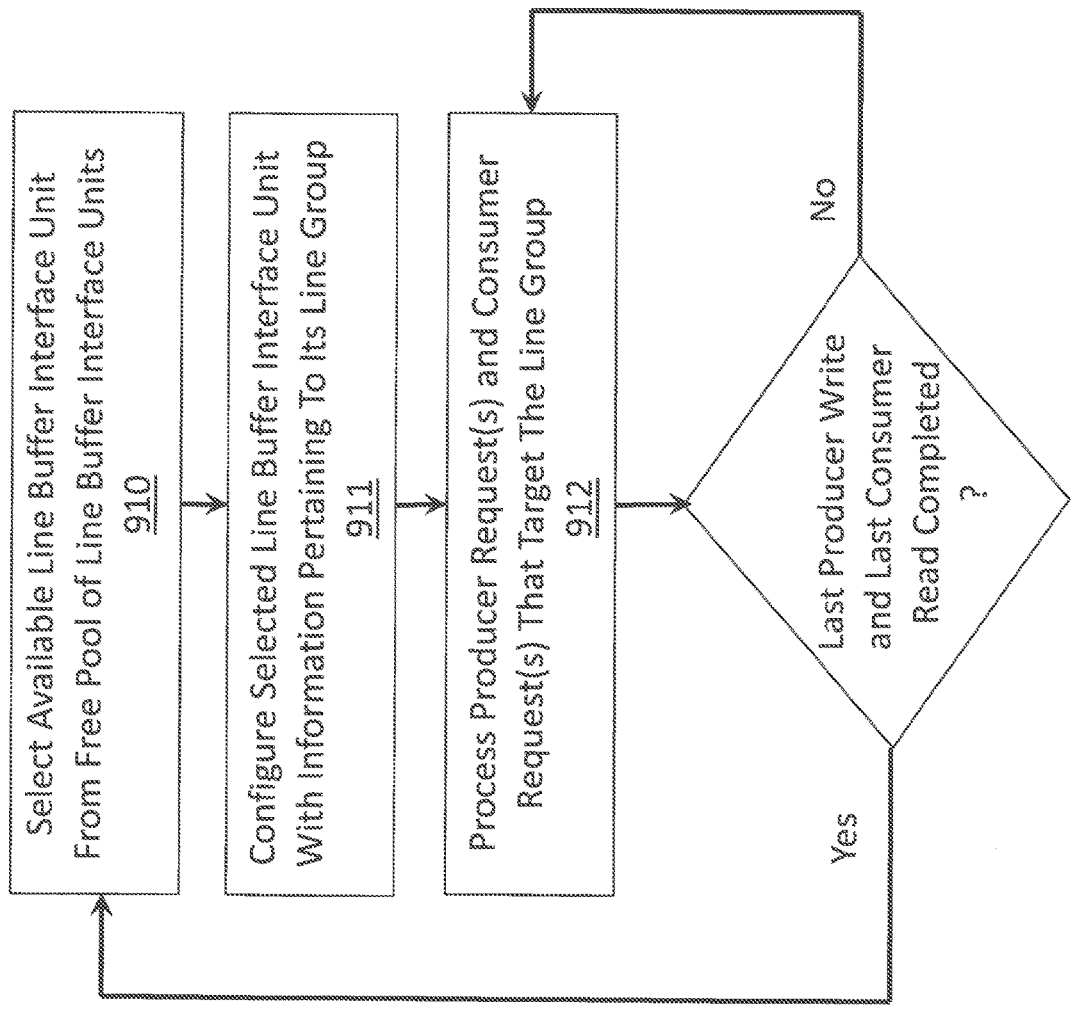

FIGS. 9a through 9c demonstrate various features of a line buffer unit embodiment 900. As observed in FIG. 9a, a line buffer unit includes memory 902 in which line groups 903_1 through 903_N are stored (e.g., static or dynamic random access memory (SRAM or DRAM)). FIG. 9a shows the activity between the various kernels that produce and consume the line groups 903_1 through 903_N for a particular image/frame within the memory 902.

As observed in FIG. 9a, a producer kernel K1 sends new line groups to the memory 902 over separate time instances P1, P2 through PN. The producer kernel K1 executes on a stencil processor that generates new sheets of data. The sheet generator that is coupled to the stencil processor accumulates sheets to form line groups and forwards the line groups to the memory 902.

Also as depicted in FIG. 9a, there are two consumer kernels K2, K3 that operate on the line groups 903_1 through 903_N generated by producer kernel K1. Here, consumer kernels K2 and K3 receive the first line group 903_1 at times C21 and C31, respectively. Obviously, times C21 and C31 occur after time P1. Other restrictions may not exist. For example times C21 and/or C31 may occur before or after any of times P2 through PN. Here, the respective sheet generators for kernels K2 and K3 request a next line group at a time that is appropriate for their respective kernel. If any of kernels K2, K3 request line group 903_1 before time P1, the request idles until after line group 903_1 is actually written into memory 902. In many implementations, a producer kernel operates on a different stencil processor than a consumer kernel.

Conceivably, requests from either or both of kernels K2 and K3 for all of line groups 903_1 through 903_N may arrive prior to time P1. Thus, line groups may be requested by consumer kernels at any time. The line groups are forwarded to the consumer kernels as they request them subject, however, to the rate at which the producer kernel K1 can produce them. In various embodiments, consumer kernels request line groups in sequence and likewise receive them in sequence (kernel K2 receives line groups 902_2 through 902_N at times C22 through C2N in sequence). For simplicity only one producer kernel is depicted for a particular line group. It is conceivable that various embodiments may be designed to permit different producers to write to a same line group (e.g., where consumers are not permitted to be serviced until after all producers have written to the line group).

In cases where there is no producer kernel (because the consumer kernel(s) is/are the first kernels in the processor's DAG processing flow), frames of image data may be transferred into memory 902 (e.g., via direct memory access (DMA) or from a camera) and parsed into line groups. In cases where there are no consumer kernel(s) (because the producer kernel is the last kernel in the processor's overall program flow), resultant line groups may be combined to form output frames.

FIG. 9b shows a more detailed embodiment of an entire line buffer unit 900. For the sake of discussion, the activity of FIG. 9a is superimposed on the line buffer unit 900 of FIG. 9b. As can be seen in FIG. 9b, a line buffer unit 900 includes memory 902 coupled to line buffer unit circuitry 901. Line buffer unit circuitry 901 may be constructed, for example, with dedicated logic circuitry. Within line buffer unit circuitry 901, a line buffer interface unit 904_1 through 904_N is reserved for each line group 903_1 through 903_N within memory 902. In various embodiments, there is a fixed number of line buffer interface units 904_1 through 904_N which sets an upper limit on the number of line groups that a line buffer unit can manage at any instant of time (if fewer than N line groups are active, a corresponding smaller number of line buffer unit interfaces are activated and in use at any time).

As depicted in FIG. 9b, with a total number of N line buffer interface units 904 within the line buffer unit circuitry 901, the line buffer unit 900 is handling a maximum number of line groups. Additionally, with a largest permitted line group size (where line group size is a configurable parameter) an approximate size for memory 902 can be determined (of course, to allow for hardware efficiencies a smaller memory footprint may be instantiated at the cost of not simultaneously permitting N maximum sized line groups).

Each line buffer interface unit 904_1 through 904_N is responsible for handling the producer and consumer requests for a particular line group that it has been assigned to handle. For example, line buffer interface unit 904_1 handles the request from producer K1 at time P1 to store line group 903_1 as well as handles the requests from consumer kernels K2 and K3 for line group 903_1. In response to the former, line buffer interface unit 904_1 writes line group 903_1 into memory 902. In response to the latter, line buffer interface unit 904_1 performs respective reads of line group 903_1 from memory 902 and forwards line group 903_1 to consumers K2 and K3 at times C21 and C31, respectively.

After all consumers of a line group have been forwarded their copy of the line group, the line buffer interface unit is "free" to be assigned to another line group. For example, if line group 903_1 represents the first line group within a first image frame of a sequence of frames, after line group 903_1 has been forwarded to consumers K2 and K3 at times C21 and C31, line buffer interface unit 904_1 may next be assigned to handle the first line group within the next, second image frame of the sequence of frames. In this manner, the line buffer unit circuitry 901 can be viewed as having a "pool" of line buffer interface units 904 where each interface unit is assigned a new line group to manage after its immediately preceding line group was delivered to its last consumer. Thus, there is a rotation of interface units as they repeatedly enter and are removed from a "free pool" of line buffer interface units who have served their last consumer and are waiting for their next line group.

FIG. 9c illustrates an embodiment of the rotation in more detail. As observed in FIG. 9c, an available line buffer interface unit is selected from a free pool of line buffer interface units within the line buffer unit circuitry 910. The line buffer interface unit is then configured with appropriate configuration information 911 (e.g., X, Y position information of the new line group or a linear memory address equivalent). Here, note in FIG. 9b that each line buffer interface unit may include configuration register space 905 where such configuration information is kept.

The line buffer interface unit then proceeds to handle producer and consumer requests for its newly assigned line group 912. After the last producer has written to the line group (in various embodiments there is only one producer per line group) and after the last consumer has been provided with the version of the line group that has been written to by its producer(s), the line buffer interface unit is returned to the free pool and the process repeats 910 for a next line group. The control logic circuitry within the line buffer unit circuitry 901 that oversees the control flow of FIG. 9c is not depicted in FIG. 9b for illustrative convenience.

b. Programmable Register Space Embodiments

With respect to the updated configuration information 911 that is provided to a line buffer interface unit as part of the assignment of a next line group, in a nominal case, the line buffer unit 900 itself is handling a static arrangement of, e.g., only one fixed producer that is feeding a fixed set of one or more consumers. In this case, primary configuration information (e.g., line group size, number of consumers, etc.) is also apt to be static and will not change from line group to line group. Rather, the new configuration information that is provided to a line buffer interface unit mainly identifies the new line group (e.g., the location of the line group within memory, etc.). More complicated potential arrangements/designs are possible, however. Some of these are described in more detail immediately below.

FIG. 9d depicts an embodiment of the contents of a line buffer interface unit's register space (e.g., the contents of register space 905_1 of FIG. 9b). A description of some of the register fields immediately follows.

The LB_Enable field 921 essentially enables a line buffer interface unit and is "set" as part of the process of taking the line buffer interface unit from the free pool. The Num_Channels field 922 defines the number of channels within the line group's image data. In an embodiment, the Num_Channels field 922 can be used to determine the total amount of data per line group. For example, a video stream often includes a frame sequence of red (R) pixels, a frame sequence of blue (B) pixels and a frame sequence of green (G) pixels. Thus, for any line group, there are actually three line groups worth of information (R, G and B).

The Num_Consumers field 923 describes the number of consumers that will request the line group. In an embodiment, the line buffer interface unit will be entered to the free pool after a line group instance has been delivered a number of times equal to the value in the Num_Consumers field 923.

The Row_Width field 924 defines the width of a full line group (e.g., in number of pixels). Note that the Row_Width 924 value can be expressed as an X coordinate value provided by the compiler. The FB_Rows field 926 defines the height of a full line group (e.g., in number of pixels). Note that the FB_Rows field 924 can be expressed as a Y coordinate value provided by the compiler.

The FB_Base_Address field 930 defines the location of the line group in the line buffer unit memory. In a first operational mode, referred to as "full" line group mode, a full sized line group is accessed in memory (line groups are received from producers and delivered to consumers as containing the full amount of their respective data). In the full line group mode, the Num_Channels field 922, the Row_Width field 924 and the FB_Rows field 926 can be used with the FB_Address field 930 to determine the range of addresses that are to be applied to memory to completely access a full line group. Additionally, these same parameters can be used to "translate" a request from a sheet generator that has requested the line group in X, Y coordinates into a linear memory address.

The VB_Enable, VB_Rows, VB_Cols, Num_Reuse_Rows and VB_Base_Address fields 925, 927, 928, 931 are used in another operational mode, referred to as the "virtually tall" line group mode, which is described in detail further below.

Whereas FIG. 9d displayed the configuration register space 905 for a single line buffer interface unit, by contrast, FIG. 9e shows an embodiment of the contents of global configuration register space 907 for the line buffer unit circuitry 901 as a whole. Whereas the per line buffer interface unit register space of FIG. 9d is focused on a specific line group, by contrast, the global register space 907 of FIG. 9e is focused on understanding the parsing of different line groups from a same image as well as other information that is specific to the producer/consumer combination that are associated with the processing of the image.

As observed in FIG. 9e, an embodiment of the global register space includes the number of channels 932 and the number of consumers 933 for a particular image. For simplicity, the register space of FIG. 9e only contemplates one image with one set of producers and consumers (e.g., only a single video stream and a single point in a DAG). Conceivably, multiple instances of the register space of FIG. 9e could be allocated to permit the line buffer unit circuitry to effectively multi-task.

A first form of multi-tasking is within a DAG or software pipeline that is implemented on the image processor. Here, the same line buffer unit could be configured to handle the line grouping for two different nodes within the DAG or for two different stages of the pipeline (that is, a single line buffer unit could support more than one stencil processor). The different nodes/stages could easily have different numbers of consumers but in many cases are likely to have the same image and stencil size characteristics. A second form of multi-tasking is across multiple different DAGs and/or multiple different pipelines that are implemented on the same image processor hardware. For example, an image processor having four stencil processors could concurrently execute two completely different two-stage pipelines that respectively process completely different image sizes with completely different stencil dimensions.

Returning to the particular embodiment of FIG. 9e, note that any particular node in a DAG or between pipeline stages can be characterized at a high level by the number of channels in the image, the image size, the dimensions of the applicable stencil and the number of consumers of the line groups (FIG. 9e again assumes one producer per line group but conceivably more than one producer could write to a single line group in which case the global register space of FIG. 9e would also include a field for the number of producers). The Num_Channels and Num_Consumers fields 932, 933 are essentially the same as the corresponding fields 922, 923 of FIG. 9c.

The Image_Size and Stencil_Dimension fields 934, 935 essentially describe the dimensions of the image to be processed and the dimensions of the stencil that will operate on the line groups that are to be carved from the image respectively. Note that both fields 934, 935 can be expressed in terms of X, Y coordinate values and can be provided from the compiler. Additionally, in an embodiment, control logic circuitry within the line buffer circuitry unit (not shown in FIG. 9b) uses the Image_Size and Stencil_Dimension fields 934, 935 to determine the Row_Width 924, FB_Rows 926 and FB_Base_Address values 930 that are loaded into a line buffer interface unit's register space when the line buffer interface unit is assigned to handle line groups from the producer/consumer set that the global information pertains to. In an alternate or further embodiment, image size is expressed as two separate values, image_width and image_height, which may have their own separately addressable register space. Likewise, stencil size may be expressed as two separate values, stencil_width and stencil_height, which may have their own separately addressable register space.

Row_Width 924 is directly obtainable from the Image_Size 934 information. For example, if Image_Size is expressed as the X, Y coordinate pair at the farthest pixel from the image origin (the upper right hand corner if the origin is at the lower left hand corner), Row_Width can be determined as the X coordinate value.

The FB_Rows and FB_Base_Address fields 926, 930 can be determined from the Image_Size and Stencil_Dimension fields 934, 935. Here, specifically, the height of each line group (FB_Rows 926) can be calculated from the height of the image (Y coordinate value of Image_Size 934) and the stencil height (Y coordinate value of Stencil_Dimension 935). Once the height of the line groups is known, the number of line groups that are to be parsed from the image and the starting linear address for each such line group in memory (FB_Base_Address 930) can also be determined.

Thus, in an embodiment, when a line buffer unit is assigned to handle a line group for a particular producer/consumer combination whose global register space is characterized by the register fields of FIG. 9e, the above described determinations are calculated on the fly and each of FB_Width 924, FB_Rows 926, Base_Address 934 are loaded into the line buffer interface unit's specific register space along with Num_Channels 922 and Num_Consumers 923 which copy over directly. Logic circuitry and data paths may therefore exist between the global register space and each instance of line buffer interface unit register space to perform these determinations and data transfers.

In an alternate embodiment, the compiler performs each of these calculations thereby eliminating much if not all of the global register space altogether. Here, for instance, the compiler can determine the Base_Address value for each line group and load the values in a look-up table within the line buffer circuitry unit. The values are called from the look-up table and loaded into a line buffer interface unit's register space as their corresponding line groups are configured for. Different combinations between these two extremes (hardware on-the-fly vs. static compiler determined) may also be implemented.

Although embodiments above emphasized the keeping of configuration information in register circuitry ("register space"), in other or combined embodiments, configuration information may be kept in memory (such as buffer unit memory) or other memory or information keeping circuitry.

c. Line Buffer Unit Embodiments & Full Line Group Mode Vs. Virtually Tall Mode

The discussions above have largely been directed to "full line group" mode in which line groups are referred to and passed between the sheet generators and line buffer unit as complete, entire line groups. In another mode, referred to as "virtually tall", line groups are referred to and passed between the sheet generators as a full width upper portion and a lower portion that is completed in separate, discrete segments.

Figure 10A:
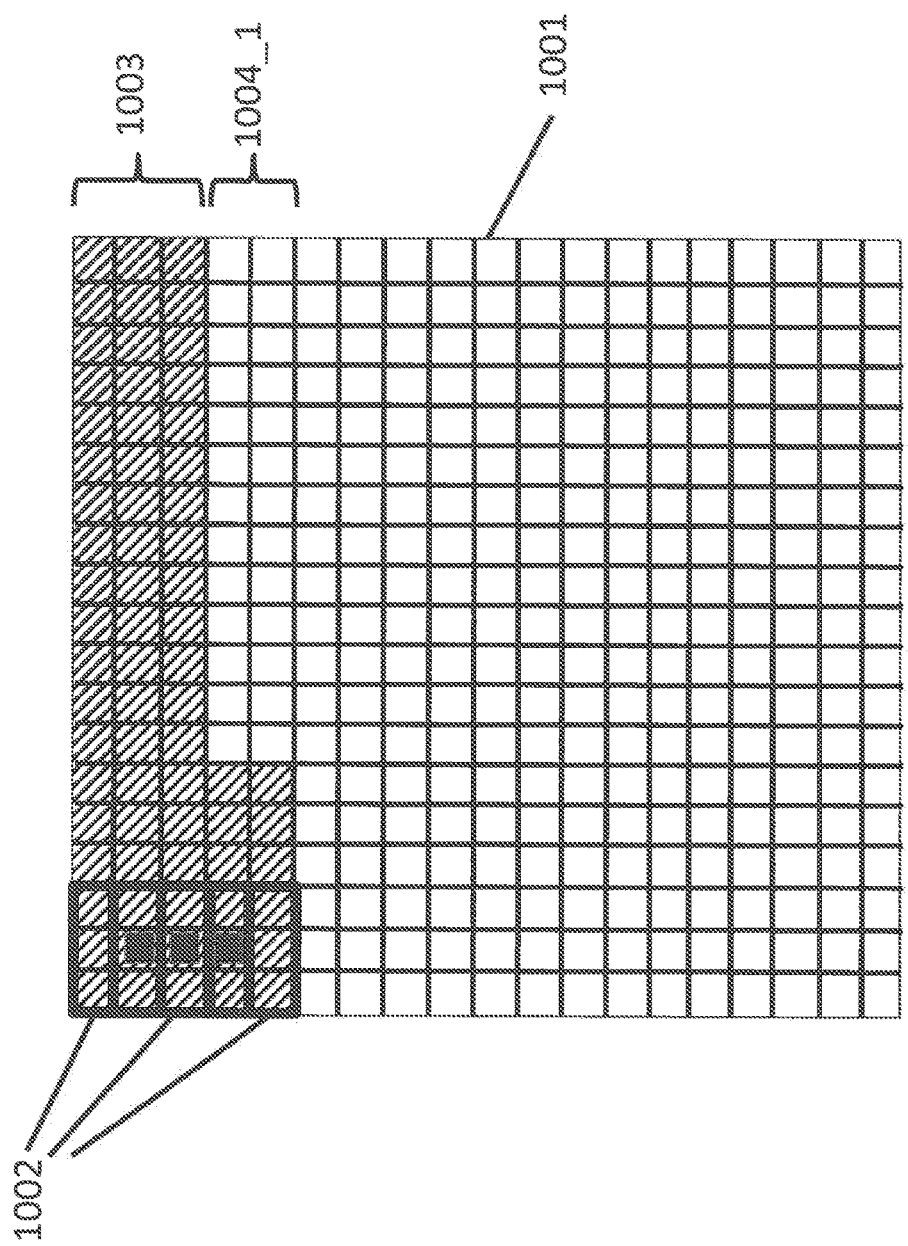
FIGS. 10a and 10b depict a virtually tall mode of operation.
Figure 10B:
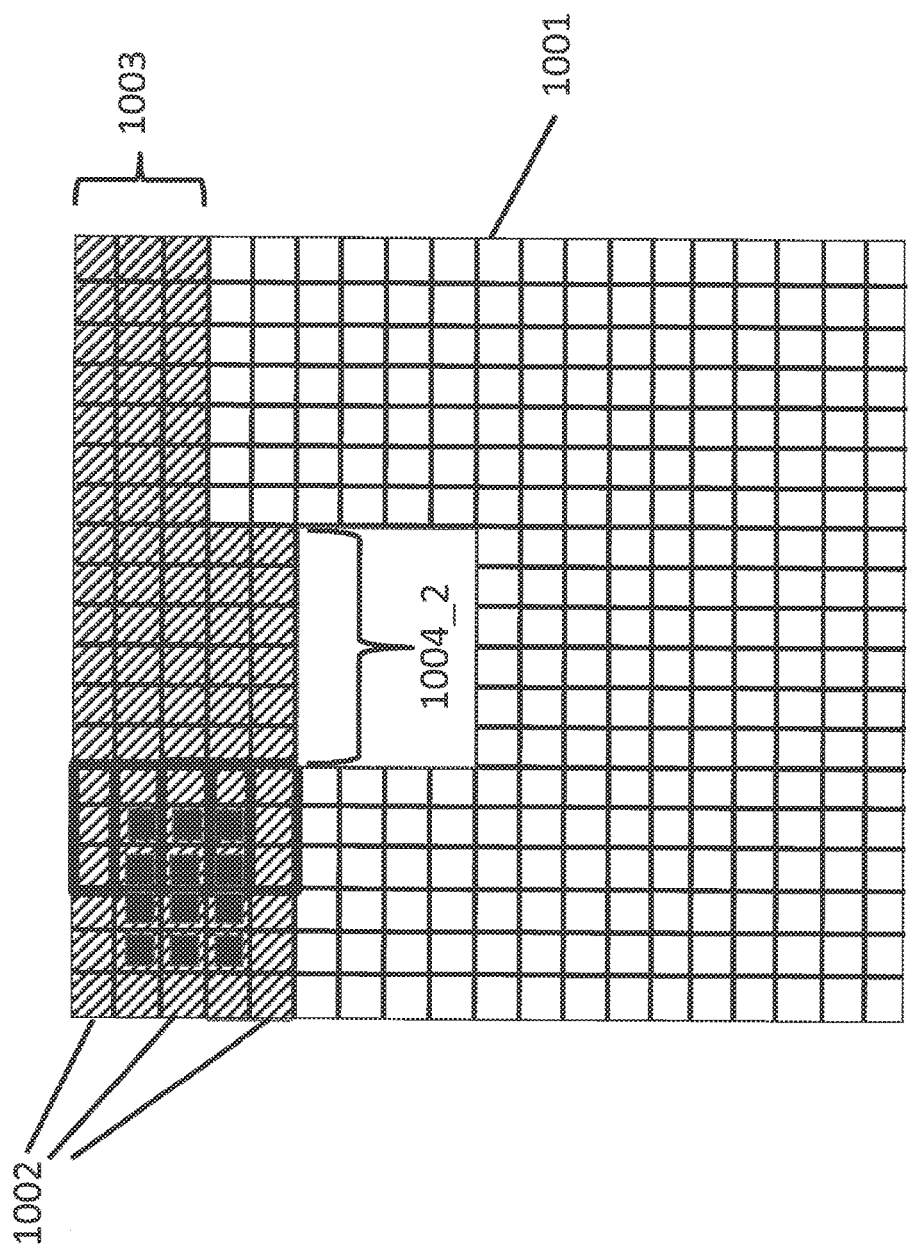

FIGS. 10a and 10b show a depiction of an exemplary virtually tall mode sequence. As observed in FIG. 10a, a line group is initially formed as an upper portion 1003 of full width rows and a first lower portion 1004_1 having only a first, shorter segment of width. The initial formation of a line group may be provided to a line buffer unit by a producing sheet generator, or, may be provided by a line buffer unit to a consuming sheet generator.

In the case of a producer, the line group is formed after the stencils 1002 have processed over the lower portion 1004_1 (the approximate stencil positioning is observed in FIG. 10b). After the producer stencil processor has processed over the lower portion 1004_1 the stencils continue forward horizontally to the right. Eventually they will process over a next lower portion 1004_2. Upon completion of the next lower portion 1004_2, the next lower portion 1004_2 is sent from the sheet generator to the line buffer unit which stores it in memory in the correct location, e.g., "next to" first lower portion 1004_1. The process continues until the line group is fully written into line buffer unit memory.

In the case of consumers, the line group is initially delivered to the sheet generator as observed in FIG. 10*a*. The stencil processor operates over the first portion 1004_1 of the line group. Upon nearing the completion of the processing of the first portion 1004_1 the sheet generator will request the next lower portion 1004_2 which is fetched from memory and delivered by the line buffer unit. The process continues until the line group is completely processed.

Note that for both producers and consumers, lower portions are specifically identified by the sheet generator. That is, in both the producer case and the consumer case, lower portion 1004_2 is specifically identified by the sheet generator and the line buffer unit specifically accesses memory to store/fetch lower portion 1004_2. In an embodiment, the sheet generator identifies lower portion 1004_2 through X, Y coordinate values that are contemplated based on information provided by the compiler (for example, any corner of lower portion 1004_2, all four corners of lower portion 1004_2, just an X coordinate value, etc.).

Figure 11A:
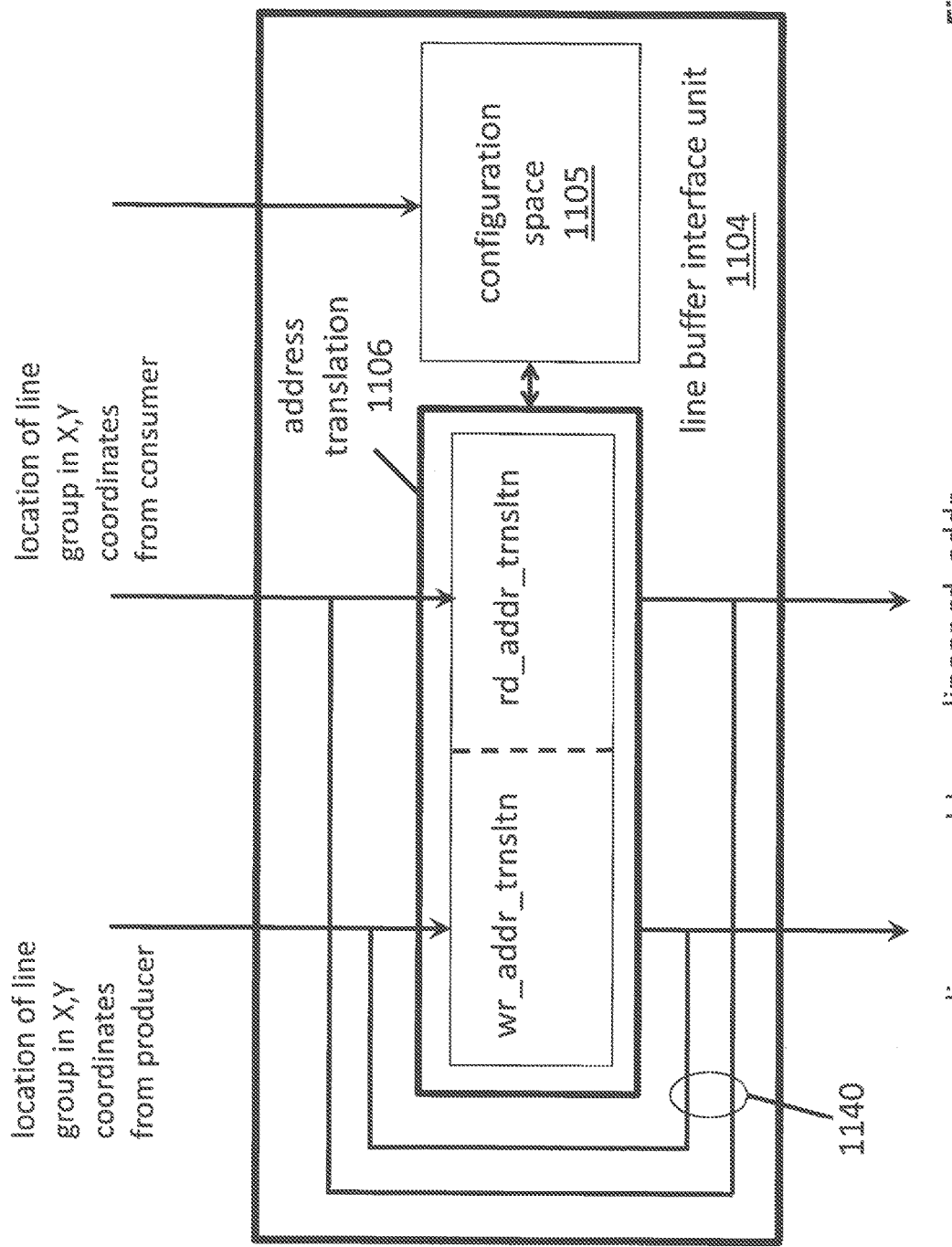
FIGS. 11a and 11b show line buffer interface unit embodiments.

FIG. 11*a* shows a first (more simplistic) embodiment of the circuitry within a line buffer interface unit 1104. As observed in FIG. 11*a*, the line buffer interface unit includes address translation circuitry 1106 to convert the identity of a line group or portion thereof (such as lower portion 1004_2 of FIG. 10*b*) that is identified by one or more X, Y coordinate values into a linear address for accessing line buffer unit memory. That is, line groups can be deemed to be "mapped" into line buffer unit memory. The translation circuitry 1106 essentially comprehends this mapping in X,Y terms and can convert the same to specific linear memory addresses.

The ability to comprehend the mapping is based on information within configuration register space 1105, an embodiment of which was provided above in FIG. 9*d*. Here, with knowledge of Row_Width 924, FB_Rows 926 and FB_Base_Address 931 the translation unit can "comprehend" the size and location of the full line group in memory. As such, for example, in the virtually tall mode, a request for a lower portion based on any X coordinate value (e.g., if the lower portion is referenced relative to the line group) or X,Y coordinate location (e.g., if the lower portion is referenced relative to the image frame) is sufficient to identify what portion is being referred to by the sheet generator. Additionally, Vb_Rows 927 and Vb_Cols 928 essentially define the dimensions of the lower portions. With knowledge of the dimensions of the upper and lower portions the amount of data to be accessed to/from buffer memory is also readily determinable. These same concepts may also to apply to full width line groups. For example, any full width line group may be identified by its X,Y location within an image. Additionally, in some embodiments, a full width line group may be passed through the network via a sequence of atomic requests/responses that reference smaller chunks of a full width line group by way of X and/or Y coordinate values.

The translation circuitry 1106 could also be used in an abstract addressing mode in which the Base_Address_Field 931 is not populated and the sheet generators refer to line groups as X,Y coordinates within an image frame. In this case, if the translation circuitry 1006 is coupled to or otherwise apprised of some of the information in the global register space of FIG. 9*e* (e.g., Image_Size, Stencil_Size), the translation circuitry 1106 could calculate all pertinent information for the line group (its dimensions and location within the frame) and convert the same to linear addresses used for accessing line buffer unit memory. In another embodiment, the translation circuitry 1106 determines the Base_Address_Field value 931 outright (based on global type information and one or more X, Y coordinates describing the line group) and loads it into its own register space 1105.

The line buffer interface unit embodiment of FIG. 11*a* also supports a linear addressing mode in which X,Y coordinate values are not used to refer to a line group (rather, traditional linear addresses are used). For the linear addressing mode, bypass paths 1140 circumvent the address translation circuitry 1106. In an embodiment, regardless of which addressing mode is used at the line buffer interface unit input, the line buffer interface unit provides standard linear memory addresses for addressing line buffer unit memory. Referring briefly back to FIG. 9*b*, the linear addresses are provided to an arbiter. Memory interface 908 resolves colliding memory access requests and accesses line buffer unit memory 902.

As discussed at length above, a sheet generator may refer to a line group with one or more X, Y coordinate values. In another embodiment, rather than the sheet generators identifying a next line group in full line group mode or a next lower portion in virtually tall mode, the sheet generators simply issue a request akin to "next" (e.g., the request only indicates a "next" full line group or "next" lower portion or "next" image data within the same full/virtually tall line group is being referred to without any coordinates).

Figure 11B:
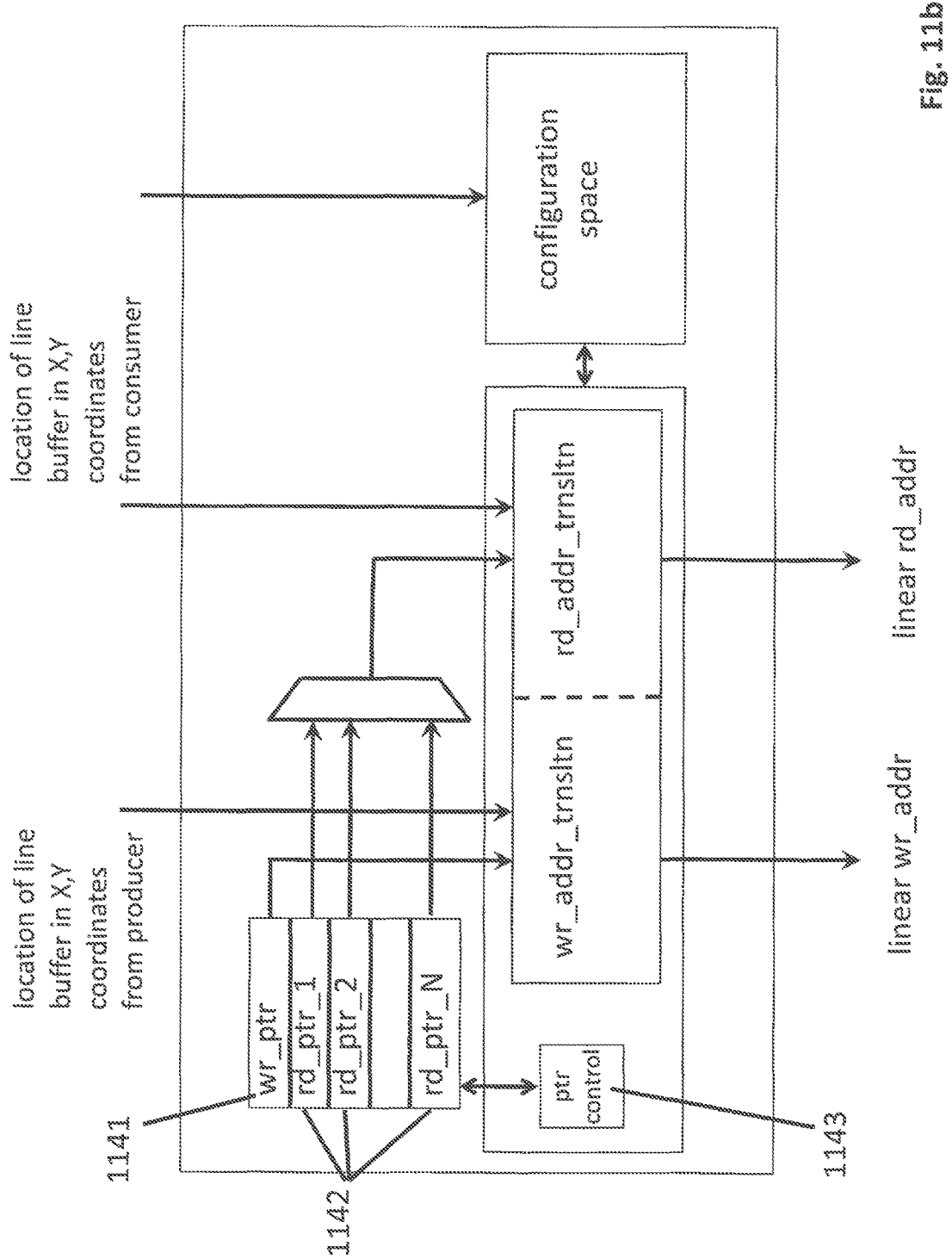

To support this avenue of communication, the line buffer unit and/or line buffer unit interface includes state register space to comprehend what the next line group/portion is. FIG. 11*b* shows an enhanced embodiment of a line buffer interface unit that keeps pointer state information so that the sheet generators can simply refer to a "next" lower portion of a line group in virtually tall mode rather than having to specify its location with X,Y coordinates. Here, a write pointer 1141 is maintained by pointer control logic circuitry 1143 that keeps track of the lower portions that have been provided by the producing sheet generator. Essentially the write pointer 1141 stores the location of the "next" portion that the producer is scheduled to deliver. In addition, the pointer state information permits sheet generators to refer only to a "next" full width line group (in full width mode) without having to specify any X,Y coordinates (because the line buffer interface unit can determine where the next full width line group for the image is).

In an embodiment, the pointer is articulated as one or more X, Y coordinates and the translation circuitry converts the same into a linear address. When the next portion is received, the pointer 1141 is updated by pointer control logic circuitry 1143 to point to the portion that will follow the portion that has just been received. Read pointers 1142 operate similarly but a separate read pointer is kept for each consumer (again, only one producer is assumed for convenience).

In the case of full line group mode, the location of the "next" full width line group is determinable from the global register information and a similar arrangement of pointers that are kept at a global level.

d. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the latter, such circuit descriptions may take the form of higher/behavioral level circuit descriptions (e.g., a VHDL description) or lower level circuit description (e.g., a register transfer level (RTL) description, transistor level description or mask description) or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

Figure 12:
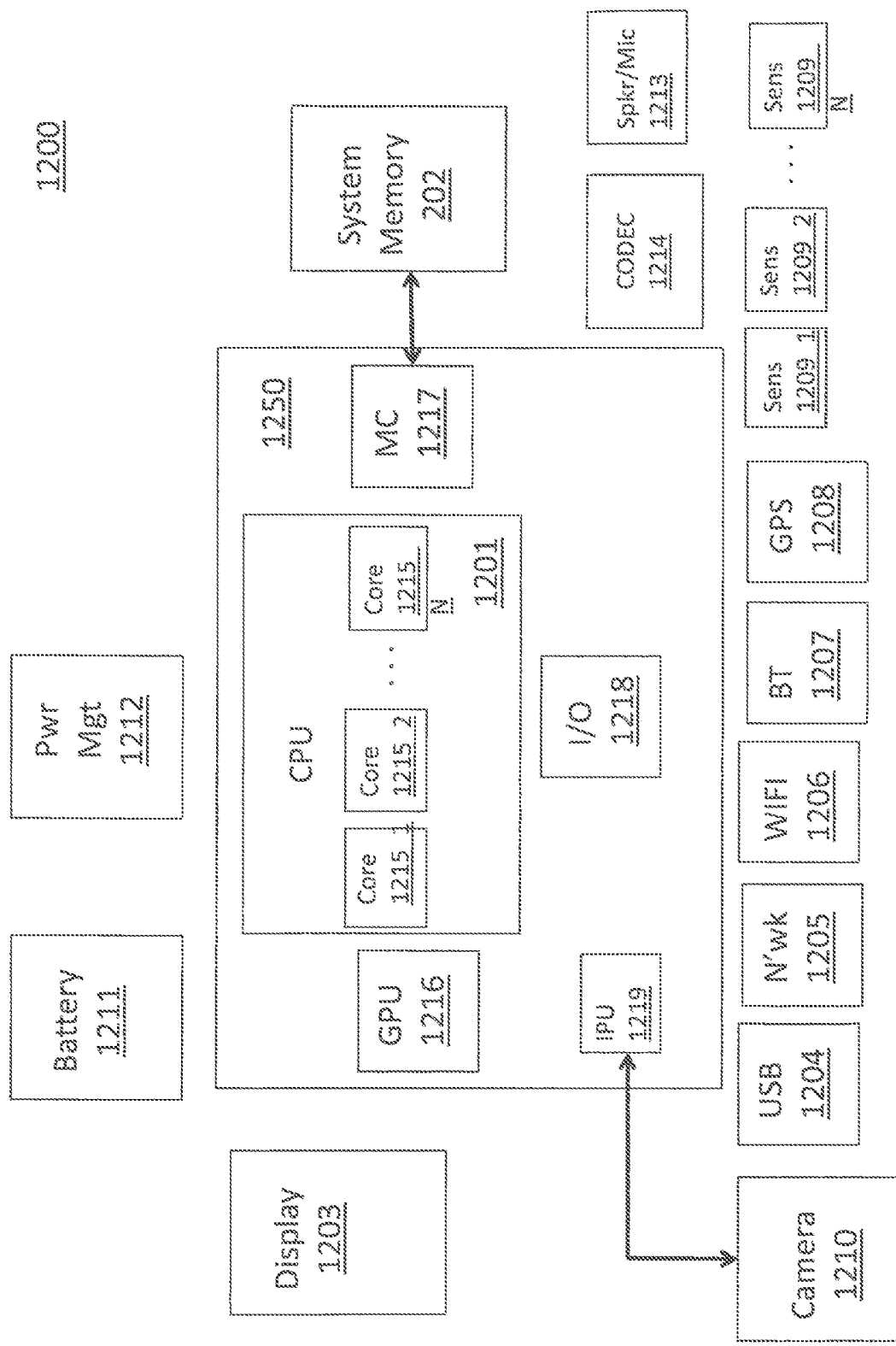
FIG. 12 shows an embodiment of a computing system.

FIG. 12 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 12, the basic computing system may include a central processing unit 1201 (which may include, e.g., a plurality of general purpose processing cores 1215_1 through 1215_N and a main memory controller 1217 disposed on a multi-core processor or applications processor), system memory 1202, a display 1203 (e.g., touchscreen, flat-panel), a local wired point-to-point link (e.g., USB) interface 1204, various network I/O functions 1205 (such as an Ethernet interface and/or cellular modem subsystem), a wireless local area network (e.g., WiFi) interface 1206, a wireless point-to-point link (e.g., Bluetooth) interface 1207 and a Global Positioning System interface 1208, various sensors 1209_1 through 1209_N, one or more cameras 1210, a battery 1211, a power management control unit 1212, a speaker and microphone 1213 and an audio coder/decoder 1214.

An applications processor or multi-core processor 1250 may include one or more general purpose processing cores 1215 within its CPU 1201, one or more graphical processing units 1216, a memory management function 1217 (e.g., a memory controller), an I/O control function 1218 and an image processing unit 1219. The general purpose processing cores 1215 typically execute the operating system and application software of the computing system. The graphics processing units 1216 typically execute graphics intensive functions to, e.g., generate graphics information that is presented on the display 1203. The memory control function 1217 interfaces with the system memory 1202 to write/read data to/from system memory 1202. The power management control unit 1212 generally controls the power consumption of the system 1200.

The image processing unit 1219 may be implemented according to any of the image processing unit embodiments described at length above in the preceding sections. Alternatively or in combination, the IPU 1219 may be coupled to either or both of the GPU 1216 and CPU 1201 as a co-processor thereof. Additionally, in various embodiments, the GPU 1216 may be implemented with any of the image processor features described at length above.

Each of the touchscreen display 1203, the communication interfaces 1204-1207, the GPS interface 1208, the sensors 1209, the camera 1210, and the speaker/microphone codec 1213, 1214 all can be viewed as various forms of I/O (input and/or output) relative to the overall computing system including, where appropriate, an integrated peripheral device as well (e.g., the one or more cameras 1210). Depending on implementation, various ones of these I/O components may be integrated on the applications processor/multi-core processor 1250 or may be located off the die or outside the package of the applications processor/multi-core processor 1250.

In an embodiment one or more cameras 1210 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A device comprising:
a plurality of line buffer interface units; and
a memory unit configured to store image data partitioned into a plurality of line groups,
wherein the device is configured to assign each line buffer interface unit to manage read and write requests for a respective line group of the plurality of line groups,
wherein each line buffer interface unit is configured to receive a write request from a producer component, to identify a write location within the memory unit corresponding to the write request, and to store data at the write location within the memory unit according to the write request,
wherein each line buffer interface unit is configured to receive a read request from one or more consumer components, to identify a read location within the memory unit corresponding to the read request, and to provide data stored at the read location within the memory unit according to the read request,
wherein, upon a line buffer interface unit completing all outstanding read requests from one or more consumers components for a particular line group, the device is configured to reassign the line buffer interface unit to manage read and write requests for a different line group,
wherein each line buffer interface unit has a dedicated programmable unit configuration space that is configured to store data representing properties of a line group to which the line buffer interface unit is assigned, and
wherein upon a line buffer interface unit being reassigned from a first line group to a second line group, the device is configured to update the data in the programmable unit configuration space of the line buffer interface unit to represent properties of the second line group.

2. The device of claim 1, wherein the data in the programmable unit configuration space represents a maximum number of consumer components that the line buffer interface unit can service simultaneously, a row width of the line group, or a base linear address in the memory unit of the line group.

3. The device of claim 1, wherein the device has a programmable global configuration space that is configured to store data representing a total size of an image having image data stored in the memory unit.

4. The device of claim 3, wherein the programmable global configuration space is configured to store data representing a number of active line buffer interface units.

5. The device of claim 1, wherein the device is configured to dynamically compute one or more data values in the programmable unit configuration space from one or more data values in a programmable global configuration space of the device.

6. The device of claim 5, wherein the device is configured to compute a number of full line group rows or a line group base address in the programmable unit configuration space from image size and stencil dimension elements of the programmable global configuration space.

7. The device of claim 1, wherein each line buffer interface unit has translation circuitry that is configured to convert a pair of values into a linear address within the memory unit.

8. The device of claim 1, wherein each line buffer interface unit is configured to maintain a pointer to a current or next segment of a line group to be provided on a next read request.

9. A method comprising:
assigning, by a device having a plurality of line buffer interface units and a memory unit storing image data partitioned into a plurality of line groups, each line buffer interface unit to manage read and write requests for a respective line group of the plurality of line groups,
receiving, by a particular line buffer interface unit of the plurality of line buffer interface units, a write request from a producer component of the device;
identify, by the particular line buffer interface unit, a write location within the memory unit corresponding to the write request;
storing, by the particular line buffer interface unit, data at the write location within the memory unit according to the write request;
receiving, by the particular line buffer interface unit, a read request from one or more consumer components of the device;
identifying, by the particular line buffer interface unit, a read location within the memory unit corresponding to the read request;
providing, by the particular line buffer interface unit, data stored at the read location within the memory unit according to the read request;
receiving, by the device, an indication that a line buffer interface unit has completed all outstanding read requests from one or more consumers components for a particular line group; and
in response, reassigning, by the device, the line buffer interface unit to manage read and write requests for a different line group,
wherein each line buffer interface unit has a dedicated programmable unit configuration space that is configured to store data representing properties of a line group to which the line buffer interface unit is assigned, and
wherein reassigning the line buffer interface unit comprises updating, by the device, the data in the programmable unit configuration space of the line buffer interface unit to represent properties of the different line group.

10. The method of claim 9, wherein the data in the programmable unit configuration space represents a maximum number of consumer components that the line buffer interface unit can service simultaneously, a row width of the line group, or a base linear address in the memory unit of the line group.

11. The method of claim 9, wherein the device has a programmable global configuration space that is configured to store data representing a total size of an image having image data stored in the memory unit.

12. The method of claim 11, wherein the programmable global configuration space is configured to store data representing a number of active line buffer interface units.

13. The method of claim 9, further comprising dynamically computing, by the device, one or more data values in the programmable unit configuration space from one or more data values in a programmable global configuration space of the device.

14. The method of claim 13, further comprising computing, by the device, a number of full line group rows or a line group base address in the programmable unit configuration space from image size and stencil dimension elements of the programmable global configuration space.

15. The method of claim 9, wherein each line buffer interface unit has translation circuitry, and further comprising: converting, by translation circuitry of the particular line buffer interface unit, a pair of values into a linear address within the memory unit.

16. The method of claim 9, further comprising maintaining, by the particular line buffer interface unit, a pointer to a current or next segment of a line group to be provided on a next read request.

* * * * *

UNITED STATES PATENT AND TRADEMARK OFFICE
CERTIFICATE OF CORRECTION

| | |
|---|---|
| PATENT NO. | : 10,321,077 B2 |
| APPLICATION NO. | : 15/598027 |
| DATED | : June 11, 2019 |
| INVENTOR(S) | : Desai et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*